(12) United States Patent
Saito

(10) Patent No.: US 11,392,198 B2
(45) Date of Patent: Jul. 19, 2022

(54) METHODS AND SYSTEMS OF EXTENDED REALITY ENVIRONMENT INTERACTION BASED ON EYE MOTIONS

(71) Applicant: Rovi Guides, Inc., San Jose, CA (US)

(72) Inventor: Sakura Saito, Tokyo (JP)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/075,232

(22) Filed: Oct. 20, 2020

(65) Prior Publication Data

US 2022/0121276 A1    Apr. 21, 2022

(51) Int. Cl.
| | |
|---|---|
| *G06F 3/01* | (2006.01) |
| *G06T 19/00* | (2011.01) |
| *G06T 19/20* | (2011.01) |
| *G06V 20/20* | (2022.01) |
| *G06V 40/16* | (2022.01) |

(52) U.S. Cl.
CPC ............ *G06F 3/013* (2013.01); *G06T 19/006* (2013.01); *G06T 19/20* (2013.01); *G06V 20/20* (2022.01); *G06V 40/171* (2022.01)

(58) Field of Classification Search
CPC ............ G06K 9/00281; G06K 9/00671; G06T 19/006; G06T 19/20
See application file for complete search history.

(56) References Cited

U.S. PATENT DOCUMENTS

| | | | |
|---|---|---|---|
| 9,202,313 B2 | 12/2015 | Bennet et al. | |
| 9,507,417 B2 | 11/2016 | Dal Mutto et al. | |
| 10,831,268 B1* | 11/2020 | Golard | G06F 3/013 |
| 10,948,983 B2 | 3/2021 | Suzuki et al. | |
| 2011/0270123 A1 | 11/2011 | Reiner | |
| 2012/0194551 A1 | 8/2012 | Osterhout et al. | |
| 2012/0200601 A1 | 8/2012 | Osterhout et al. | |
| 2012/0281181 A1 | 11/2012 | Chen et al. | |
| 2013/0147836 A1* | 6/2013 | Small | G06F 3/013 345/633 |
| 2013/0278631 A1 | 10/2013 | Border et al. | |
| 2013/0328762 A1 | 12/2013 | McCulloch et al. | |
| 2014/0148728 A1 | 5/2014 | Eizenman et al. | |
| 2014/0253701 A1* | 9/2014 | Wexler | H04M 1/72403 348/62 |

(Continued)

FOREIGN PATENT DOCUMENTS

WO    2018156912 A1    8/2018

OTHER PUBLICATIONS

International Search Report and Written Opinion dated Jul. 9, 2021 in connection with PCT/US2020/067335.

(Continued)

*Primary Examiner* — Chong Wu
(74) *Attorney, Agent, or Firm* — Haley Guiliano LLP

(57) ABSTRACT

Systems and methods are described for extended reality environment interaction. An extended reality environment including an object is generated for display, and an eye motion is detected. Based on the detecting, it is determined whether the object is in a field of view for at least a predetermined period of time, and in response to determining that the object is in the field of view for at least the predetermined period of time, one or more items related to the object are generated for display in the extended virtual reality environment.

20 Claims, 15 Drawing Sheets

(56) References Cited

U.S. PATENT DOCUMENTS

| | | |
|---|---|---|
| 2015/0338915 A1 | 11/2015 | Publicover et al. |
| 2016/0093113 A1 | 3/2016 | Liu et al. |
| 2016/0105757 A1 | 4/2016 | Vennstrom et al. |
| 2016/0162020 A1 | 6/2016 | Lehman et al. |
| 2017/0011745 A1 | 1/2017 | Navaratnam |
| 2017/0038837 A1 | 2/2017 | Faaborg et al. |
| 2017/0061694 A1 | 3/2017 | Giraldi et al. |
| 2017/0135577 A1 | 5/2017 | Komogortsev |
| 2018/0150204 A1 | 5/2018 | Macgillivray |
| 2018/0182025 A1* | 6/2018 | Smith ................ G06Q 30/0623 |
| 2018/0275753 A1 | 9/2018 | Publicover et al. |
| 2018/0286122 A1 | 10/2018 | Nakashima et al. |
| 2019/0265802 A1 | 8/2019 | Parshionikar |
| 2019/0286227 A1 | 9/2019 | Samadani et al. |
| 2019/0294239 A1 | 9/2019 | Suzuki et al. |
| 2019/0311232 A1 | 10/2019 | Hall et al. |
| 2020/0019237 A1 | 1/2020 | Jackson |
| 2020/0020167 A1 | 1/2020 | Depies et al. |
| 2020/0035006 A1* | 1/2020 | De ......................... G06F 3/013 |
| 2020/0057425 A1 | 2/2020 | Seibert et al. |
| 2020/0249752 A1 | 8/2020 | Parshionikar |
| 2020/0394830 A1 | 12/2020 | Choubey et al. |
| 2020/0410996 A1 | 12/2020 | Brandel et al. |
| 2021/0236845 A1 | 8/2021 | Ng et al. |

OTHER PUBLICATIONS

U.S. Appl. No. 17/075,222, filed Oct. 20, 2020, Ankur Anil Aher.
U.S. Appl. No. 17/075,224, filed Oct. 20, 2020, Ankur Anil Aher.
U.S. Appl. No. 17/075,227, filed Oct. 20, 2020, R Balaji.
U.S. Appl. No. 17/075,229, filed Oct. 20, 2020, R Balaji.

* cited by examiner

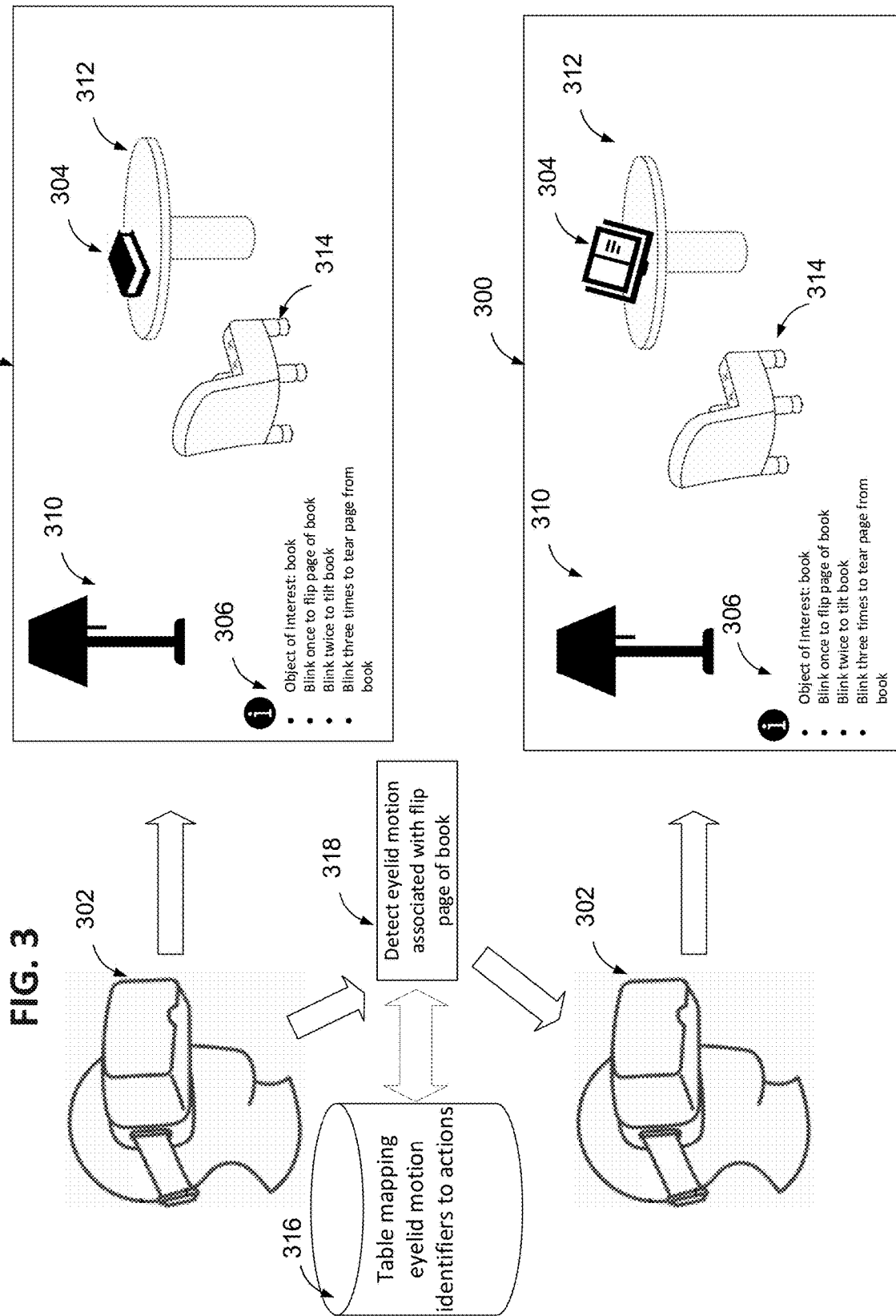

METHODS AND SYSTEMS OF EXTENDED REALITY ENVIRONMENT INTERACTION BASED ON EYE MOTIONS

BACKGROUND

This disclosure relates to improved extended reality environment interaction and, in particular, systems and methods are disclosed for detecting eye motion and performing operations in an extended reality environment reality environment based on the detected eye motion.

SUMMARY

Advancements in media technology have led to development of extended reality (XR) technologies, such as virtual reality (VR), augmented reality (AR) and mixed reality (MR) technologies. VR systems may fully immerse (e.g., giving the user a sense of being in an environment) or partially immerse (e.g., giving the user the sense of looking at an environment) users in a three-dimensional, computer-generated environment. The environment may include objects or items that the user can interact with. AR systems may provide a modified version of reality, such as enhanced information overlaid over real world objects. MR systems map interactive virtual objects to the real world. Such systems may utilize wearables, such as a head-mounted device, comprising a stereoscopic display, or smart glasses.

XR systems introduce many challenges. For example, it may be difficult for XR systems to detect when a user alters his or her field of view or focus in the XR environment, since the wearable device being used to view the environment may not include an external device (e.g., a lens). As another example, although pupil dilation and constriction may vary depending on what a user is viewing in an XR environment or an amount of light entering the eye of the user, a user may not have control over his or her pupil, and thus monitoring the user's pupil may not be a reliable way to determine a gaze or field of view of the user within an XR environment. Worse, even if a field of view of the user is accurately ascertained, if there are multiple objects in the field of view of the user, it may be difficult to determine which object the user desires to interact with.

In addition, current approaches to XR suffer from certain drawbacks. In one approach, a user employs hand gestures or a joystick to navigate an XR environment. However, requiring such user inputs to interact with the XR environment may be cumbersome or inconvenient for the user, not to mention take away from the experience of XR (i.e., remind the user that the XR environment is not real). In addition, in current approaches to XR, it may not be possible for a user to conveniently obtain information concerning objects in his or her field of view or that he or she interacts with in the XR environment.

To overcome these problems, systems and methods are provided herein for identifying an object in a field of view of a user, detecting eyelid motion of the user, and based on such detection, regenerating for display the object in an extended reality environment with a modified level of detail. Systems and methods described herein also provide matching a detected eyelid motion and a stored eyelid motion identifier and performing an action on an object based on such matching. In addition, systems and methods are provided to generate an indicator to reflect a gaze shift of a user to a new portion of an extended reality environment including an object, and execute an action when a voice command is received while the indicator is in a vicinity of the object.

Systems and methods described herein also provide for generating for display within an extended reality environment opacity-based indicators in a vicinity of a portion of the extended reality environment including an object, and varying opacity of such indicators based on an identified boundary of the object. In addition, systems and methods are provided to enable a user to conveniently obtain additional information about items in the extended reality environment.

In some aspects of the disclosure, the extended reality system generates for display an extended reality environment including a first object and receives input from one or more sensors. Based on the received input, the system identifies the first object in a field of view and detects an eyelid motion, and in response to detecting the eyelid motion, regenerates for display the first object with a modified level of detail. Thus, eyelid motion can be monitored in order to overcome challenges associated with determining which object in a field of view of the user is of interest to the user. In addition, detecting such eyelid motion of the user enables the user to view, for example, finer details of an object that appears to be far away from the user within the extended reality environment, which may improve the user experience in the extended reality system, particularly for a user having impaired vision.

The extended reality environment may comprise a plurality of objects including the first object and a second object in the field of view, and the system may regenerate for display the first object with the modified level of detail in response to determining that the detected eyelid motion is associated with the first object. If the system determines that the detected eyelid motion is associated with the second object, the system may regenerate for display the second object with a modified level of detail. The first object may be in one of a foreground or a background in the field of view in the extended reality environment, and the second object may be in the other of the foreground or the background in the field of view in the extended reality environment.

In some embodiments, regenerating for display the first object with the modified level of detail comprises presenting the object in a higher resolution. Additionally or alternatively, one or more actions may be performed on the first object based on one or more detected eyelid motions.

In some aspects of this disclosure, the system computes respective virtual distances of the plurality of objects with respect to a user, and identifying the first object in the field of view comprises determining the first object is at a closest virtual distance to the user of the respective virtual distances.

In some embodiments, detecting the eyelid motion comprises determining an amount of motion of the eyelid and/or detecting the eyelid motion comprises determining one or more eyelid levels. The system may detect that a user is navigating from a first position to a new position in the extended reality environment, while the first object remains in the field of view, and generate for display an updated version of the first object based on a perspective of the user at the new position.

In some aspects of the disclosure, an extended reality system generates for display an extended reality environment including an object, and stores in memory a table of eyelid motion identifiers and corresponding actions performable on the object in the extended reality environment. Using a sensor, the system detects an eyelid motion, and matches the detected eyelid motion to one of the stored eyelid motion identifiers. In response to matching the detected eyelid motion to one of the stored eyelid motion identifiers, the system generates for display an updated version of the extended reality environment based on the action that corresponds to the matched eyelid motion. Thus, eyelid motion can be monitored in order to overcome challenges associated with determining which object is a field of view the user desires to interact with. In addition, detecting such eyelid motion of the user enables the user to interact with an object that appears to be far away from the user within the extended reality environment, which may improve the user experience in the extended reality system, particularly for a user having impaired vision.

The object may be selected from a plurality of objects in the extended reality environment by detecting that a gaze of a user is directed at the object. The system may generate for display a subset of the eyelid motion identifiers performable on the object at which the gaze of the user is directed (e.g., to remind or guide the user as to an action that a certain eyelid motion causes to be performed). The action of the plurality of actions may correspond to manipulating the object and/or altering the appearance of the object (e.g., if the object is a book, the action may be flipping pages of the book, tilting the book, tearing out a page of the book, etc.). The system may detect that the user is navigating from a first position to a new position in the extended reality environment, while the gaze of the user remains on the object, and generate for display an updated version of the first object based on a perspective of the user at the new position, the updated version of the object having the altered appearance.

In some embodiments, a user may be associated with a user profile specifying relationships between eyelid motion identifiers and corresponding actions performable on the object in the extended reality environment. The actions performable on the object may vary based on a type of the object. To detect the eyelid motion the system may determine whether the eyelid remains closed for a predetermined period of time, and match the detected eyelid motion to one of the stored eyelid motion identifiers in response to determining that the eyelid remains closed for the predetermined period of time (e.g., to ensure the eyelid motion is not involuntary blinking).

In some aspects of the disclosure, the extended reality system generates for display an extended reality environment comprising an object, and detects, using a first sensor, that a gaze has shifted from a first portion of the extended reality environment to a second portion of the extended reality environment, where the object is excluded from the first portion of the extended reality environment and included in the second portion of the extended reality environment. In response to detecting the gaze shift, the system generates for display within the extended reality environment an indicator of the shift in the gaze, and detects, by using a second sensor, a voice command while the indicator is in a vicinity of the object. In response to detecting the voice command, the extended reality system executes an action corresponding to the voice command. Thus, extended reality may be leveraged in combination with voice to improve the user experience. More specifically, a user may conveniently use his or her eyes to navigate an extended reality environment (e.g., as a proxy for how a mouse or trackpad is used with a desktop, laptop or mobile device), receive real-time confirmation as to a location of his or her gaze, and perform desired actions in the environment via a voice command when an indicator of the gaze of the user is in the vicinity of an object of interest in the extended reality environment.

An interactive media guide may be provided on the display, and the above-mentioned action may be an instruction related to a media asset accessible via the interactive media guide. The voice command may include an identification of the media asset and a command to execute the action, and/or an instruction to present a new media asset on the display and/or an instruction to retrieve content related to an entity, where the object is associated with the entity.

In some embodiments, the extended reality system may determine whether a rate of retinal movement exceeds a predetermined value, and in response to determining that the rate of retinal movement exceeds the predetermined value, normalize the retinal movement when translating the retinal movement into movement of the indicator on the display. The system may detect the voice command while the indicator is in the vicinity of the object (e.g., overlapping the object) upon determining the gaze is directed at the object for at least a predetermined threshold period of time. The display is presented via a virtual reality head-mounted device.

In some aspects of the disclosure, an extended reality system may generate for display an extended reality environment comprising an object, and detect, by using a sensor, a gaze is directed to a first portion of the extended reality environment, where the object is included in the first portion of the extended reality environment. The extended reality system may generate for display within the extended reality environment a plurality of opacity-based indicators in the vicinity of the first portion of the extended reality environment, identify a boundary of the object, and varying an opacity of the at least one of the plurality of opacity-based indicators based on the identified boundary of the object. Thus, a user may conveniently use his or her eyes to navigate an extended reality environment (e.g., as a proxy for how a mouse or trackpad is used with a desktop, laptop or mobile device) and receive real-time confirmation as to a location of his or her gaze, where opacity of indicators of such real-time gaze are conveniently adjusted so as not to obscure the view of the user and avoid degrading the user's experience.

The extended reality system may determine whether the at least one of the opacity-based indicators overlaps the boundary of the object, and vary respective opacities of opacity-based indicators that overlap the boundary. The plurality of opacity-based indicators are arrows directed towards the object. The extended reality system may detect, by using the sensor, whether the gaze has shifted to a second portion of the extended reality environment, and in response to determining that the gaze has shifted to the second portion, cause the plurality of opacity-based indicators to be overlaid in a vicinity of the second portion of the display.

In some embodiments, the respective opacities are varied based on a distance from the object. For example, the respective opacities of the indicators may increase as the distance between the indicator and the object decreases (e.g., to emphasize the object the user is gazing at) or increase as the distance between the indicator and the object decreases (e.g., to avoid obscuring the object the user is gazing at).

In some embodiments, an interactive media guide may be is provided on the display, and an action related to a media asset accessible via the interactive media guide is received at least in part based on the detected gaze. Such display may be presented via a virtual reality head-mounted device or presented without the use of a virtual reality head-mounted device.

In some aspects of the disclosure, an extended reality system generates for display a extended reality environment including an object, detects an eye motion, and determines, based on the detecting, whether an object is in a field of view for at least a predetermined period of time. In response to determining that the object is in the field of view for at least the predetermined period of time, the system generates for display in the extended reality environment one or more items related to the object. Thus, information for an object of interest may be conveniently displayed to the user based on detecting his or her eye motion related to the object of interest.

The one or more items related to the object may comprise textual information, images, video, or any combination thereof. The system may further determine that at least a second predetermined period of time has elapsed from commencing the display of the one or more items without the object being in the field of view for the first predetermined period of time, and cease display of the one or more items in response to such determination. The extended reality environment may be presented via a virtual reality head-mounted device. In some embodiments, detecting the eye motion comprises monitoring an eyelid motion or monitoring gaze.

The system may determine whether the object is in the field of view for the predetermined period of time upon determining that the field of view is continuously (or non-continuously) on the object for the predetermined period of time during a virtual reality session.

In some embodiments, the system may determine a new object is in the field of view for at least the predetermined time, and in response to such determination, generate for display in the extended reality environment one or more items related to the new object, while continuing to generate for display in the extended reality environment the one or more items related to the object.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which:

FIG. 3 shows an example of performing an action on an object in an extended reality environment, in accordance with some embodiments of this disclosure;

DETAILED DESCRIPTION

Figure 1:
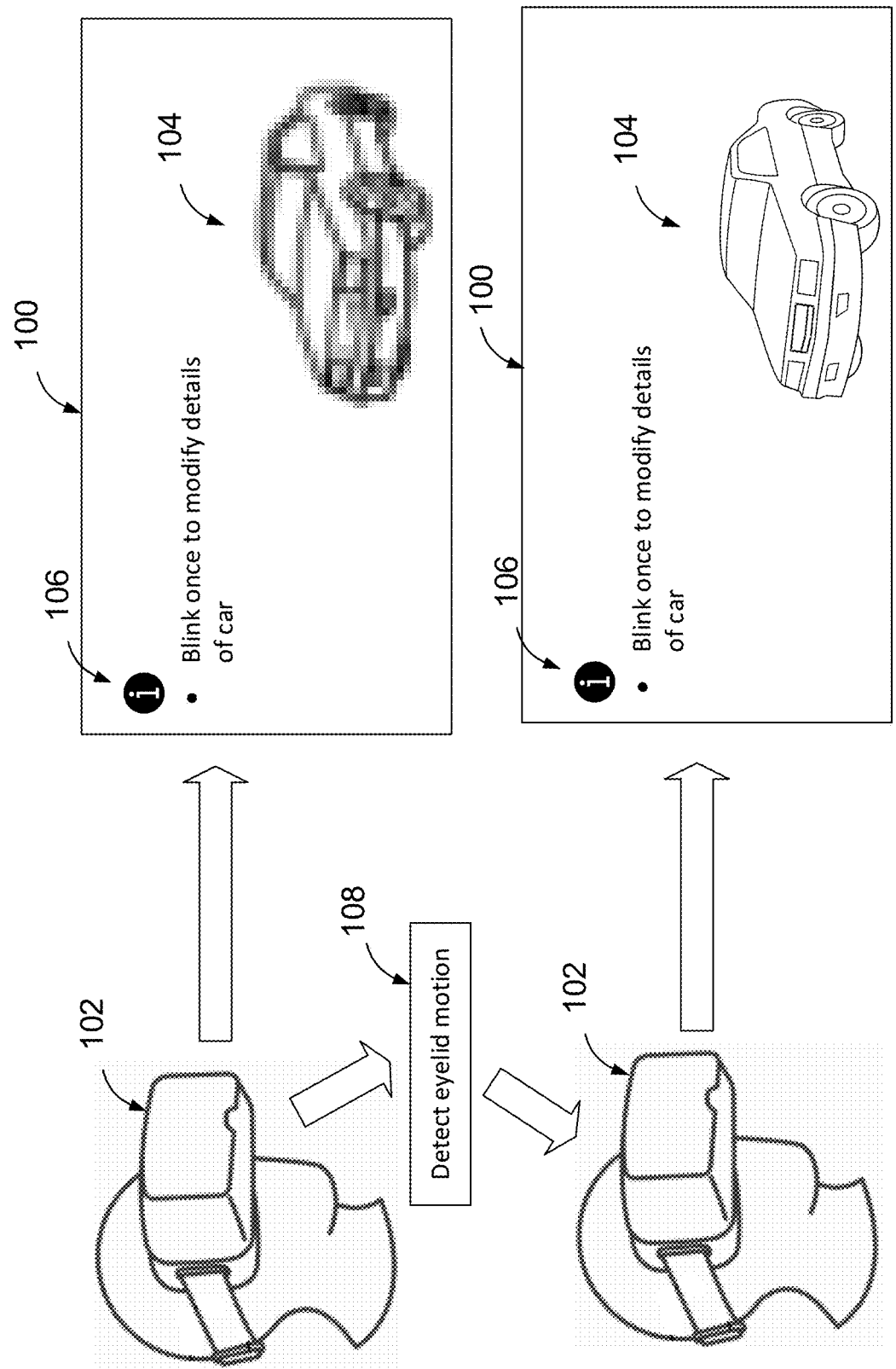
FIG. 1 shows an example of regenerating for display an object in an extended reality environment, in accordance with some embodiments of this disclosure.

FIG. 1 illustrates an exemplary process of regenerating for display an object in an extended reality (XR) environment, in accordance with some embodiments of this disclosure. Head-mounted display 102 may project images to generate a three-dimensional XR environment 100 for immersing a user therein. The user may be fully or partially immersed in XR environment 100, and such environment may be a completely virtual environment. Head-mounted display 102 may alternatively be a wearable device (e.g., smart glasses), or a computer or mobile device equipped with a camera and XR application, to facilitate generation of environment 100. Environment 100 may alternatively be an augmented reality (AR) environment in which real-world objects are supplemented with computer-generated objects or information, or mixed reality (MR), e.g., where virtual objects interact with the real world or the real world is otherwise connected to virtual objects. In some embodiments, a view or perspective of the user of environment 100 changes as the user moves his or her head, and other features (e.g., audio) are suitably modified, simulating the physical world. Environment 100 may be for entertainment purposes (e.g., video games, movies, videos, sports, etc.), communication (e.g., social media), educational purposes (e.g., a virtual classroom), professional purposes (e.g., training simulations), medical purposes, etc.

The XR system may identify one or more objects in a field of view of the user. A field of view is a portion of XR environment 100 that is presented to the user at a given time by the display 102 (e.g., an angle in a 360-degree sphere environment). The field of view may comprise a pair of 2D images to create a stereoscopic view in the case of a VR device; in the case of an AR device (e.g., smart glasses), the field of view may comprise 3D or 2D images, which may include a mix of real objects and virtual objects overlaid on top of the real objects using the AR device (e.g., for smart glasses, a picture captured with a camera and content added by the smart glasses). If an XR environment has a single degree of liberty, e.g., a rotation of 360 degrees, any field of view may be defined by either the edge angular coordinates (e.g., +135 degrees, +225 degrees) or by a single angular coordinate (e.g., −55 degrees) combined with the known angular opening of the field of view. If an XR environment has six degrees of liberty, say three rotations of 360 degrees and three spatial positions, any field of view may be defined by three angular coordinates and three spatial coordinates. A field of view may therefore be understood as a portion of the XR environment displayed when the user is at a particular location in the XR environment and has oriented the XR set in a particular direction.

An XR system (e.g., system 900 of FIG. 9) may generate a data structure for the field of view, including object identifiers associated with virtual objects in the field of view, and such data structure may include coordinates representing the position of the field of view in the XR environment. The system may determine the present field of view based on the data structure and/or images captured by the XR device 102, and identify objects in the field of view of the user. As shown in the example of FIG. 1, the detected field of view of the user in environment 100 includes object 104, depicted as a car, although one of skill in the art will appreciate that any number or combination of different types of objects may be included in environment 100. The XR system may generate for display object 104 in a default level of detail (e.g., a default resolution or number of displayed pixels, or a default size or appearance). For example, objects in environment 100 may be presented by default in 4K resolution (3840×2160), or any other suitable resolution. The resolution of objects in environment 100 may be the same, or vary, for each eye of the user. In some embodiments, the level of detail may refer to a size or appearance of the object, e.g., the object may be generated at a default size or default color.

In some embodiments, upon determining the one or more objects 104 in the field of view of the user, the XR system may generate for display identifiers 106 (e.g., "Blink once to modify details of car"), which may indicate or otherwise provide guidance to the user as to how a particular eyelid motion causes certain actions to be performed on object 104. In some embodiments, the XR system may reference a table (e.g., table 316 of FIG. 3, which may be stored in storage 808 of FIG. 8) that includes a plurality of eyelid motion identifiers and corresponding actions performable on object 104 in the XR environment. For example, the table may additionally store an identifier (e.g., blinking twice) which may correspond to increasing or decreasing the size of the object displayed to the user upon detecting the indicated eyelid motion.

Once the objects of interest in the field of view are identified, the XR system may detect an eyelid motion 108 of the user by using a sensor (e.g., a camera). In some embodiments, the XR system may detect whether eyelid motion exceeds a predetermined period of time (e.g., 0.5 seconds or 1 second) in order to avoid performing an action based on an involuntary blink (e.g., if such action is not desired by the user). In response to detecting the eyelid motion 108 of the user (e.g., a single blink corresponding to an action of modifying details of the object of interest), the XR regenerates for display object 104, provided to the user via head-mounted display 102. For example, object 104 may be presented to the user at a higher resolution (e.g., 8K resolution, 7680×4320) than initially provided (e.g., 4K resolution, 3840×2160). In some embodiments, the detected eyelid motion may cause the XR system to modify details of object 104 in a different manner (e.g., increasing or decreasing the size of the object as compared to the initial presentation of the object, changing the color or texture of an object as compared to an initial appearance of the object, etc.).

In some embodiments, detecting the eyelid motion comprises determining an amount of motion of the eyelids or detecting the eyelid motion comprises determining one or more eyelid levels. For example, the XR system may detect an amount of motion of the eyelids using a sensor (e.g., a camera) and may compare the detected an amount to a threshold amount of motion over a predetermined period of time (e.g., five eyelid motions detected over a three-second period of time), and an image may be modified or selected when the detected amount of motion of the eyelids exceeds the threshold amount of motion over the predetermined period of time. As another example, the XR system may detect, using a sensor (e.g., a camera), one or more eyelid levels (e.g., distinct eyelid levels) over a predetermined period of time, and may compare the detected amount to a threshold number of eyelid levels over a predetermined period of time (e.g., five distinct eyelid levels detected over a three second period of time), and an image may be modified or selected when the detected number of eyelid levels exceeds the threshold number of eyelid levels over the predetermined period of time.

Figure 2:
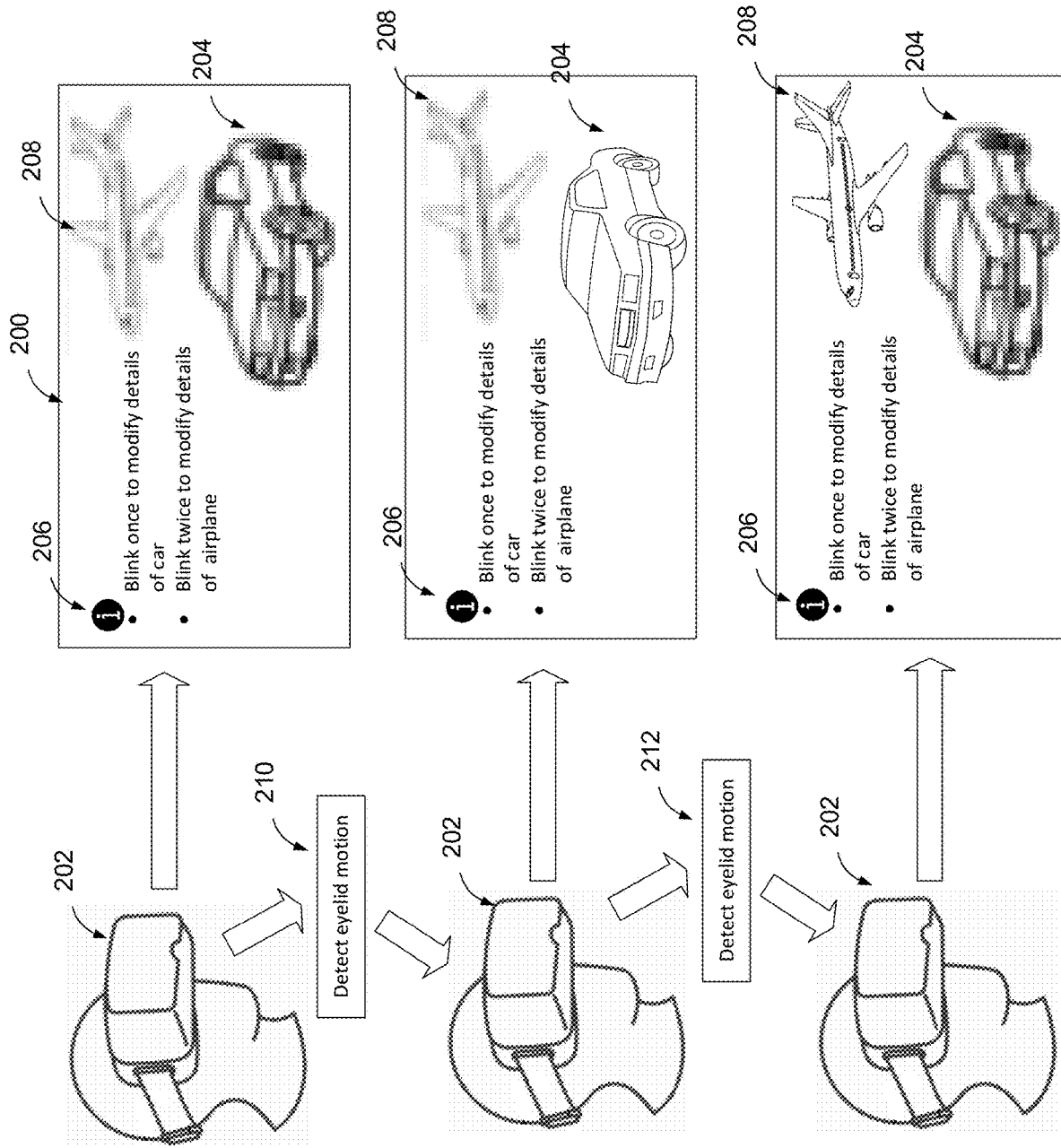
FIG. 2 shows an example of regenerating for display an object in an extended reality environment, in accordance with some embodiments of this disclosure.

FIG. 2 shows an exemplary process in which multiple objects are detected in the field of view of the user. The XR system may detect that objects 204 and 208 are each in the field of view of the user being displayed XR environment 200 via head-mounted display 202. As shown in environment 200 at a top-most portion of FIG. 2, the objects 204, 208 detected as being in the field of view of the user may initially be presented with a default level of detail (e.g., a default resolution, or a default size). Upon detecting eyelid motion 210 (e.g., corresponding to "Blink once to modify details of car" indicated in identifiers 206), the XR system may regenerate for display object 204 in the field of view with a modified level of detail (e.g., enhance the resolution of object 204). On the other hand, upon detecting eyelid motion 212 (e.g., corresponding to "Blink twice to modify details of airplane" indicated in identifiers 206) the XR system may regenerate for display object 208 in the field of view with a modified level of detail (e.g., enhance the resolution of object 208).

In some embodiments, detecting further eyelid motion 212 may cause the modification performed in response to detecting eyelid motion 210 to subsequently be reversed (e.g., object 204 may revert to the default resolution initially presented to the user, while object 208 is presented with modified details). Alternatively, an object may be maintained in the modified state throughout the XR session, and/or in future sessions. In some embodiments, detecting that an eyelid motion is re-performed may cause the action to be reversed (e.g., detecting eyelid motion 210 a second time may cause object 204 to revert to the default resolution initially presented to the user). In some embodiments, of the plurality of objects that may be in the field of view of the user, one of such objects (e.g., object 204) may be in the foreground of the display of XR environment 200, and the other of such objects may be in the background of the display (e.g., object 208) in XR environment 200. In addition, one or more actions may be performed on the modified object in the field of view of the user (e.g., a particular eyelid motion may correspond to opening the door of the car object 204, or interacting with the airplane object 208). The most recently modified object in the field of view may be a "selected" object such that actions may be performed on such object. Such aspects may enable an object that is distant from the user, or otherwise too small to be seen in detail, to be regenerated for display in modified detail to allow the user to clearly view the object.

In some aspects of this disclosure, the XR system may detect the eyelid motions of the user in congruence with the objects in his or her field of view, and may compute relative extent to which an eyelid is closed, to determine which object to initially focus on in the user's field of view. In some embodiments, when the user enters the XR environment, the XR system may set a default field of view, detect the number of objects in the environment and/or in the field of view, and compute respective virtual distances, or focal lengths, of the each of the detected objects with respect to a user. The objects may be at different virtual distances from the user. In some embodiments, identifying an object in the field of view comprises determining the object is at a closest virtual distance to the user of the respective virtual distances or focal lengths. The virtual distance may be, for example, the perceived distance the object in the XR environment is located from the user, and may be calculated based on coordinates of the object in the XR environment. Eyelid levels of the user may be calculated at least in part based on such virtual distances, and upon detecting a change in eyelid level, an object that is a closest virtual distance to the user may be detected and selected as the object of interest, to which modifications may be performed.

In some embodiments, the XR system may detect movement of the user around XR environment 200, and that, as the user moves around, his or her field of view changes. In such circumstance, the field of view of the user may be reset, in order to determine a number of objects in the user's new field of view. On the other hand, if the XR system detects movement of the user around XR environment 200, but that the gaze of the user still remains fixed on a particular object, the display 200 may generate for display such object from varied perspectives, consistent with the movement of the user, to maintain the simulated environment. In some embodiments, any change of eyelid levels detected by the virtual reality system may be used to determine the object, the detail of which is to be modified, in the field of view of the user. The XR system may track the user's movements within the XR environment by using sensors (e.g., gyroscopes, accelerometers, cameras, etc., in combination with control circuitry).

FIG. 3 shows an exemplary process of performing an action on an object in an XR environment, in accordance with some embodiments of this disclosure. Head-mounted display 302 may generate for display XR environment 300 including objects 304, 310, 312, 314. Although four objects are shown in environment 300 (book object 304, lamp object 310, desk object 312 and chair object 314), it should be appreciated that any number of objects, and any type of objects, may be generated for display. The XR system (e.g., system 900 of FIG. 9) may store (e.g., in storage 808 of FIG. 8) table 316 of eyelid motion identifiers and corresponding actions performable on the object in the XR environment. For example, table 316 may store a plurality of associations, including associations for the book object 304, as indicated by identifiers 306, which may be displayed to the user to facilitate desired actions: "Blink once to flip pages of book; Blink twice to tilt book; Blink three times to tear page from book." It will be appreciated that any number of actions, and any type of identifier, may be stored in table 316, and that an action may depend on the type of object (e.g., table 316 may store an identifier associated with an action to turn on a virtual light bulb in connection with lamp object 310). In a case where the environment includes multiple objects, an object may be selected from the plurality by detecting (e.g., using a sensor) that a gaze of a user is directed at the object.

The XR system detects, by using a sensor (e.g., a camera), an eyelid motion of the user. The system may determine whether the detected eyelid motion matches any of the identifiers in table 316, e.g., by analyzing the sensor output and comparing such output to the stored identifiers (e.g., predetermined number of blinks, blink patterns, amount of eyelid motion, eyelid levels, etc.). In some embodiments, the stored identifiers may include eyelid motions in combination with voice commands or other inputs. In some embodiments, the XR system may detect whether eyelid motion exceeds a predetermined period of time (e.g., 0.5 seconds) in order to avoid performing an action based on an involuntary blink (e.g., if such action is not desired by the user). The system may detect eyelid motion of the user based on an extent of opening and closing of eyelids of the user over time.

In response to matching the detected eyelid motion to one of the stored eyelid motion identifiers, the XR system generates for display an updated version of XR environment 300 based on the action that corresponds to the matched eyelid motion. In the example of FIG. 3, the system detects eyelid motion associated with flip page of book 318, and executes such action, as shown in environment 300 in the bottom portion of FIG. 3 depicting a flipped page of the book object 304, as compared to the book object 304 in the top portion of the environment 300 depicting a closed book. One of skill in the art will appreciate that the objects in environment 300 may be manipulated in various ways, e.g., chair object 314 may be moved adjacent to a different portion of table object 312, or altered in various ways, e.g., removing a cushion from chair object 314.

In some embodiments, a subset of the identifiers 306 suitable for a selected object of interest may be displayed to the user, for the convenience of the user in determining available actions to be performed based on a particular eyelid motion. In some embodiments, the XR system may store one or more user profiles specifying relationships between eyelid motion identifiers and corresponding actions performable on the object in XR environment 300. For example, the user profile may include, e.g., actions tailored to the user preferences, favorite actions of the user, most recently performed actions of the user, most commonly performed actions of the user, purchase actions of the user, etc., which may be displayed in association with identifiers 306 for the convenience of the user.

In some embodiments, the XR system may detect movement of the user around XR environment 200, and may detect, as the user moves around, that the gaze of the user changes. In such circumstance, the system may select a new object of interest. Alternatively, the system may detect that the user is navigating from a first position to a new position in the XR environment, while the gaze of the user remains on an object, and in response to such determination, generate for display an updated version of the object based on a perspective of the user (e.g., alter the size or angle of the object presented to the user). The updated version of the object may include presenting the object to the user having the altered appearance (e.g., the book with a torn page, in the event the user previously performed the eyelid motion associated with such action in table 316).

In some embodiments, the aspects discussed in FIGS. 1-2 may be combined with the embodiments of FIG. 3 (e.g., objects in the XR environment may be regenerated in more detail, and various actions may be performed on such objects, in a single user session in the XR environment).

Figures 4A, 4B:
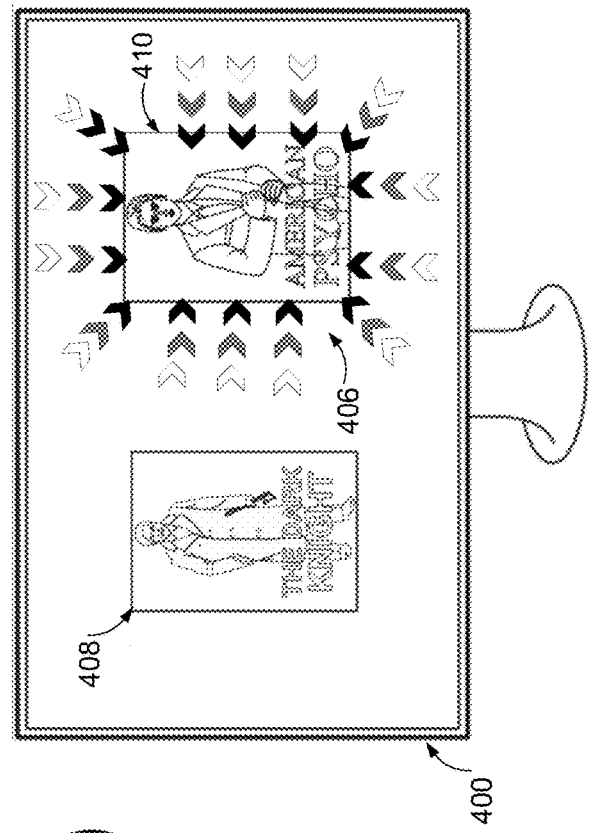
FIGS. 4A-4B show an example of receiving a voice command while an indicator is in a vicinity of an object in an extended reality environment, in accordance with some embodiments of this disclosure.

FIGS. 4A-4B show an example of receiving a voice command while an indicator is in a vicinity of an object in an XR environment, in accordance with some embodiments of this disclosure. The XR system (e.g., system 900 of FIG. 9) may generate for display via head-mounted display 402 XR environment 400 to the user. In some embodiments, XR environment 400 may include an interactive media guide application to facilitate selection and consumption of media content. XR environment 400 may include one or more objects 408, 410, which may correspond to identifiers for selectable media content. The system detects by using a sensor (e.g., a camera), that a gaze of the user has shifted from a portion of the XR environment (e.g., in the vicinity of object 408; FIG. 4A) to another portion of the XR environment (e.g., in the vicinity of object 410; FIG. 4B). It should be appreciated that FIGS. 4A-4B are exemplary, and the gaze of the user has shifted from a portion of XR environment 400, which may contain no objects or multiple objects, to another portion of XR environment 400.

In response to detecting the gaze shift, the XR system may generate for display, within XR environment 400, indicator 406 indicating the shift in the gaze. For example, indicator 406 in FIG. 4A reflects that the gaze of the user is on object 408 (e.g., an identifier for the movie "The Dark Knight"), and in FIG. 4B indicator 406 reflects the gaze of the user has shifted to object 410 (e.g., an identifier for the movie "American Psycho"). In some embodiments, a single indicator may be generated for display, or alternatively multiple indicators may be generated for display. In some embodiments, the indicators may vary in translucence based on proximity to the object of interest. In the example of FIGS. 4A-4B, indicator 406 is shown as arrows directed to the object of interest, although it will be appreciated by those of skill in the art that the indicator may comprise any suitable indicia or marking to cause the associated object to be emphasized or prominently displayed to the user. For example, the indicators may be a certain color or shape to highlight the object of interest, images or emojis of eyeballs, magnification of the object in the vicinity of the indicators, animation of the object in the vicinity of the indicators, etc.

The system may detect, by using a sensor (e.g., a microphone), a voice command while indicator 406 is in a vicinity of object 410 (e.g., if the indicator overlaps, or otherwise is within a predetermined distance of, the object of interest). The XR system may process the voice command, and execute the action (e.g., provided there is a match between the object included in the voice command and the object at which the gaze of the user is directed, as indicated by indicator 406). For example, upon receiving the voice command 404 in the example of FIG. 4A, the system may commence presentation of the media asset "The Dark Knight" associated with object 408, and upon receiving voice command 405 in the example of FIG. 4B, the system may commence presentation of the media asset "American Psycho" associated with object 410. In some embodiments, if it is determined by the user that the indicators are not accurately reflecting his or her gaze, the system may accept a suitable voice command from the user requesting the system to recalibrate his or her gaze, and/or indicating which portion of the display the user believes he or she is gazing at.

In some embodiments, the gaze of the user is detected based on a retinal movement of the eye (tracked by a sensor, e.g., a camera measuring reflections of a light source off the retina, eye tracking glasses, screen-based eye tracking). The retinal movement of the user may be plotted or translated to the display of the XR environment as movement of indicator 406 on the display. In some aspects of this disclosure, the system may determine whether a rate of retinal movement exceeds a predetermined value, and in response to such determination, performs normalization when translating the retinal movement into movement of indicator 406 on the display of the XR environment. For example, if the speed of the gaze shift exceeds a predetermined threshold, normalization may be performed to slow movement of indicator 406 on the display (e.g., to enable the user to more easily track the movement of indicator 406 on the display). The entire cluster of indicators may move to such new portion of the display.

In some embodiments, the system includes an electronic voice recognition (or voice-assisted) device (e.g., a television, a computer, a voice assistant) responsive to user voice commands, and the voice input may be in the form of audio or digital signals (or audio or digital input). The system may perform natural language understanding (NLU) techniques, and may include natural language understanding circuitry and/or speech-to-text circuitry to transcribe the voice command to text, and may parse the voice command to identify and extract keywords from the voice input. The system may compare the extracted keyword to metadata associated with an object of interest to determine whether there is a match, e.g., whether to execute the voice command. In some embodiments, if the received voice command does not match the object in the vicinity of the indicator, the system may notify the user of the mismatch and refrain from executing the associated action, or prompt the user for a new voice command.

In some embodiments, the voice command includes an identification of the media asset and a command to execute the action (e.g., play, fast-forward, rewind, etc.), or an instruction to present a new media asset on the display (e.g., to scroll through other media assets or move to a new page of media assets in a carousel). In some aspects of this disclosure, determining that the indicator is in the vicinity of the object comprises determining that the gaze of the user is directed at the object for at least a predetermined threshold period of time (e.g., five seconds).

Figure 5:
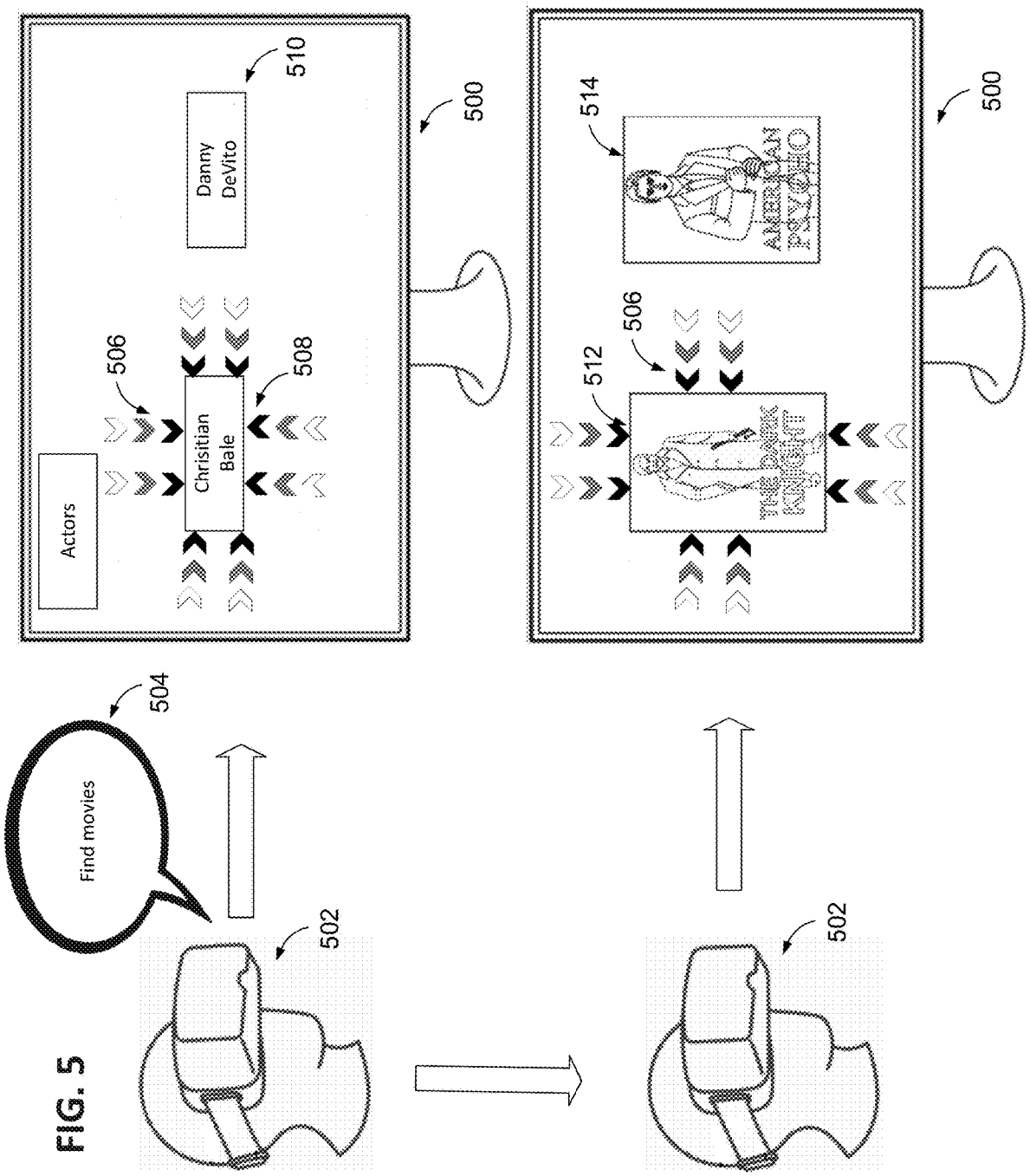
FIG. 5 shows an example of receiving a voice command while an indicator is in a vicinity of an object in an extended reality environment, in accordance with some embodiments of this disclosure.

FIG. 5 shows an example of receiving a voice command while an indicator is in a vicinity of an object in an XR environment, in accordance with some embodiments of this disclosure. XR system (e.g., system 900 of FIG. 9) may include head-mounted display 502 and generate for display XR environment 500 including objects 508, 510 by way of head-mounted display 502. As shown in the top environment 500 of FIG. 5, the system may detect, by using a sensor (e.g., a camera), a gaze of the user is directed to a portion of the XR environment (e.g., including object 508). The system may generate for display within XR environment 500 a plurality of opacity-based indicators 506 in the vicinity of the portion including object 508 of XR environment 500. In the example of FIG. 5, indicator 506 is shown as arrows directed to the object of interest, although it will be appreciated by those of skill in the art that the indicator may comprise any suitable indicia or marking to cause the associated object to be emphasized or prominently displayed to the user. For example, the indicators may be a certain color or shape to highlight the object of interest, images or emojis of eyeballs, magnification of the object in the vicinity of the indicators, animation of the object in the vicinity of the indicators, etc.

The system may identify boundaries (e.g., edges, shape outline, border) of object 508, e.g., by edge detection techniques, retrieving coordinates of object 508, analyzing pixel values of the area surrounding object 508, etc. Based on the identified boundary of the object, the XR system may vary an opacity of at least one of the plurality of opacity-based indicators 506. In some embodiments, the system may determine whether at least one of the plurality of opacity-based indicators overlaps, or is within a predetermined distance of, the boundary of the object, and in response to such determination, may vary the respective opacities of the one or more indicators 506 that overlap the boundary of object 508. For example, the system may compare coordinates of the object of interest in XR system 900 of FIG. 9 to coordinates of the indicators 506. In some embodiments, if the system detects that the gaze of the user shifts from a portion of the display (e.g., including object 508) to a portion of the display including another object (e.g., object 510), the system causes the plurality of opacity-based indicators to be overlaid in a vicinity of the portion of the display including object 510. The entire cluster of indicators may move to such new portion of the display.

Figure 6:
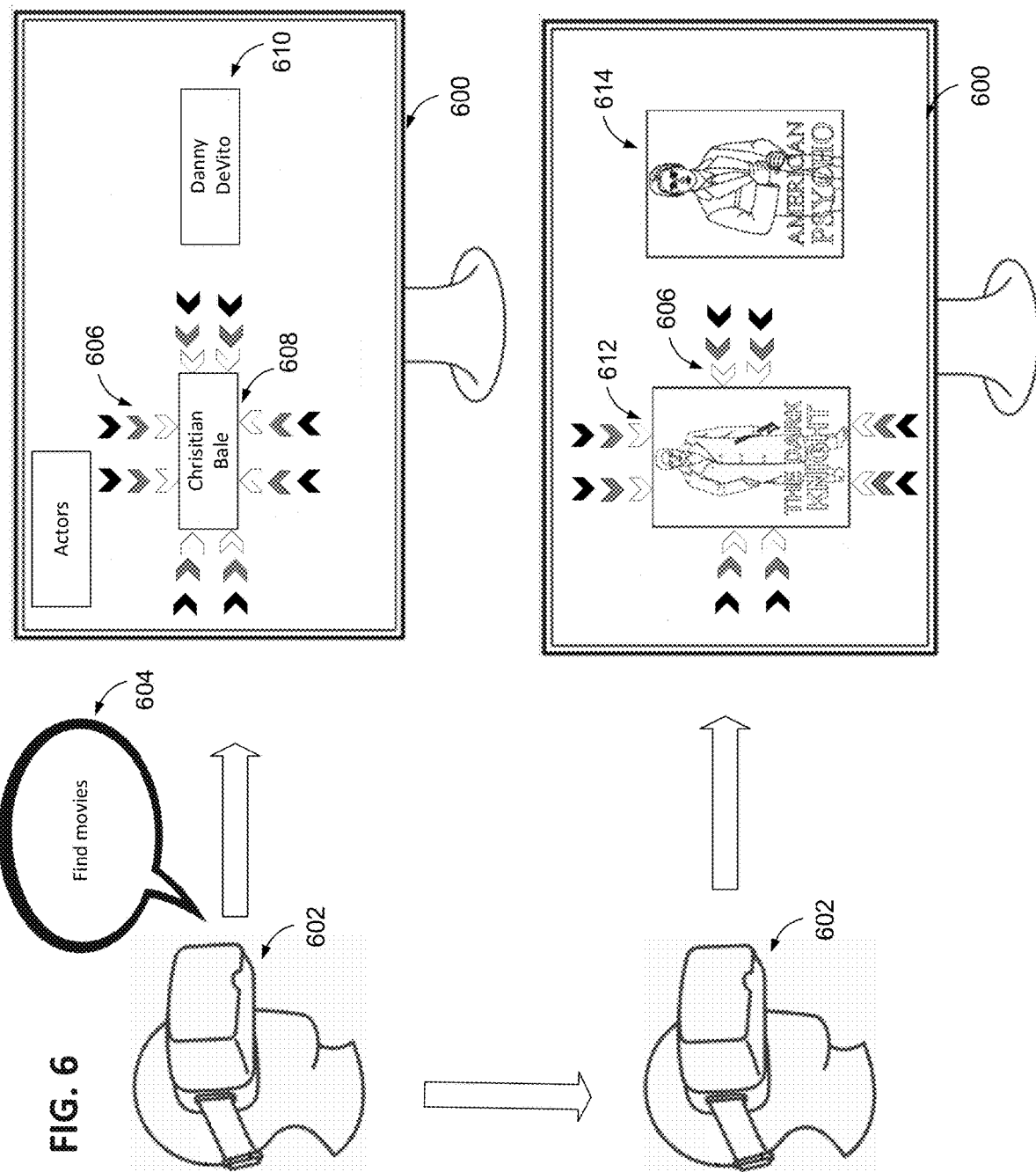
FIG. 6 shows an example of receiving a voice command while an indicator is in a vicinity of an object in an extended reality environment, in accordance with some embodiments of this disclosure.

The system may vary the respective opacities based on a distance from the object. As shown in the example of FIG. 5, the respective opacities of indicators 506 may increase as the distance between indicator 506 and object 508 decreases. This may be desirable in order to emphasize to the user the portion of the display to which his or her gaze is directed. Alternatively, as shown in the example of FIG. 6, the respective opacities of indicators 606 may decrease as the distance between the respective indicator 606 and object 608 decreases. This may be desirable in order to minimize obscuring portions of the object of interest. In some embodiments, the system may determine whether any of the indicators overlap or are otherwise in a vicinity of another object, which may not be of interest, and in such circumstance, the indicators may be set to be translucent to avoid either obscuring portions of such object not of interest or incorrectly indicating to the user that such object is of interest.

As shown in the examples of FIG. 5 and FIG. 6, XR environment 500, 600, respectively, may include an interactive media guide. In response to receiving a voice command to perform an action associated with an object in the vicinity of indicators 506, 606, the system may perform the action (e.g., generate for presentation identifiers for movies having metadata associated with "Christian Bale," the actor associated with object 508, 608). Although the examples of FIGS. 5-6 show objects related to an "actor" category, various other categories may be generated for display and browsed (e.g., genre, cast, director, etc.). In some embodiments, the environments 500, 600 may be presented with or without an XR head-mounted device. For example, the XR environment may be presented as fully immersive VR, or in AR overlaid on a television screen such as shown in FIGS. 5-6, or MR.

In some embodiments, the features of the examples of FIGS. 1-4 may be used in conjunction with the features of the examples of FIGS. 5-6. For example, indicators (e.g., such as indicators 106 in FIG. 1) may be displayed to the user to guide the user in performing eyelid motions or gazes, which may be associated with performable actions (e.g., in table 316 of FIG. 3). The indicators of FIGS. 5 and 6 may also be used in connection with other environments (e.g., video games, sports, communications, social media, etc.).

Figure 7:
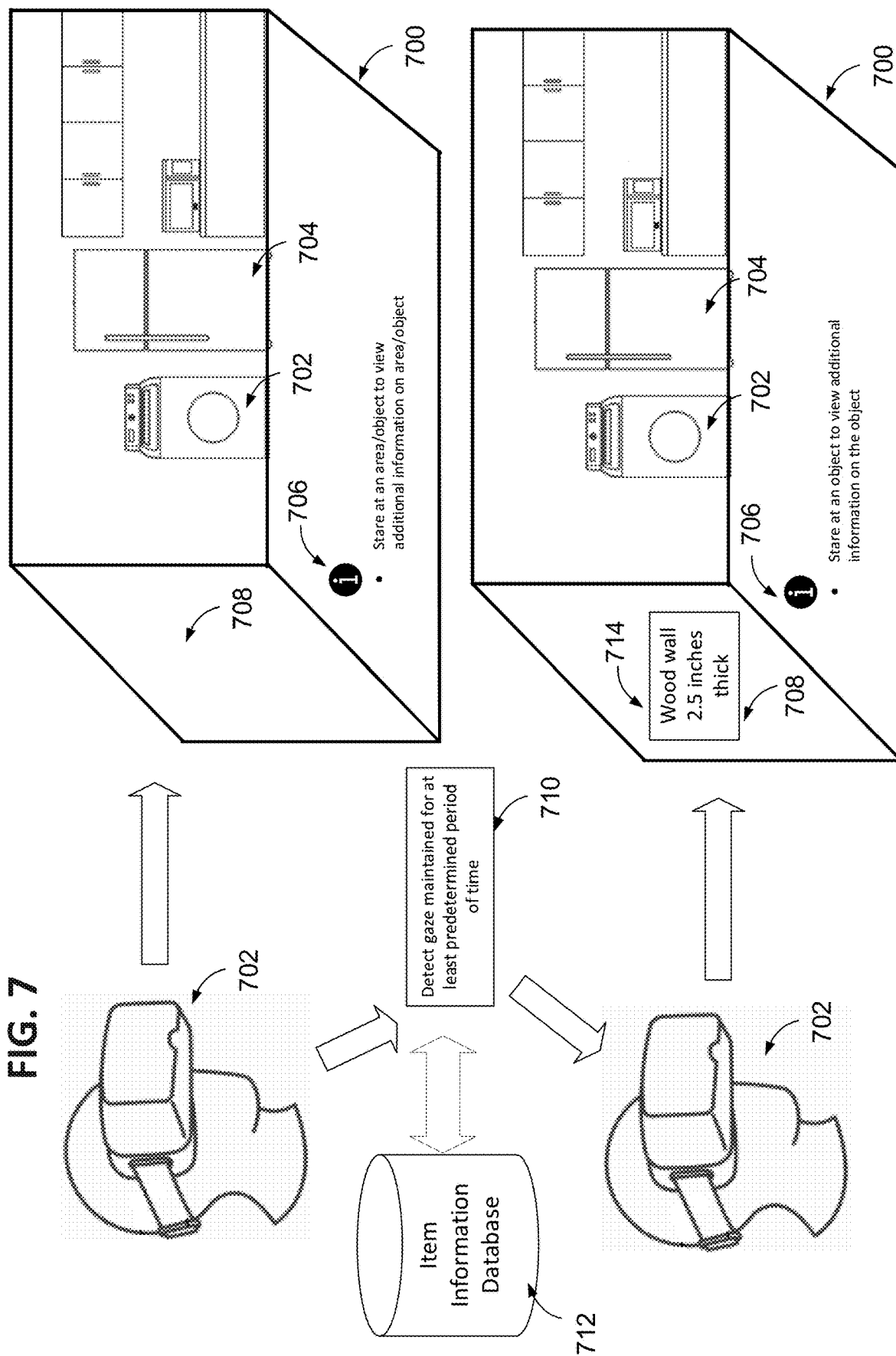
FIG. 7 shows an example of presenting information related to an item in an extended reality environment, in accordance with some embodiments of this disclosure.

FIG. 7 shows an example of presenting additional information related to an item in an XR environment, in accordance with some embodiments of this disclosure. Head-mounted display 702 presents XR environment 700 to the user. XR environment 700 may include one or more objects, e.g., washing machine object 702, refrigerator object 704, wall object 708, etc. In some embodiments, XR environment 700 includes identifier 706, which may indicate to the user actions that may be taken in environment 700. Although environment 700 shows a room in a building (e.g., a house or apartment), environment 700 may comprise any virtual or augmented environment, e.g., a mountain range, a scenic location, a video game being played by the user, etc.

The system detects an eye motion of the user (e.g., via a sensor), and based on the detected eye motion, determines whether an object (e.g., washing machine object 702, refrigerator object 704, and/or wall object 708) is in a field of view of the user for at least a predetermined period of time 710 (e.g., five seconds). In response to determining that an object (e.g., wall object) is in the field of view for at least the predetermined period of time, the system generates for display in the XR environment one or more items 714 related to object 708. One or more items 714 related to the object may comprise textual information, images, video, or any combination thereof, and may be retrieved from item information database 712 (e.g., stored in storage 808 of FIG. 8). For example, item 714 indicates a thickness of wall object 708, and such additional information may be provided when a user gazes at wall object 708 via head-mounted display 702 in XR environment 700. In some embodiments, detecting the eye motion comprises monitoring an eyelid motion. In some aspects of the disclosure, generating for display in the XR environment one or more items 714 related to object 708 is performed in response to detecting both that object 708 is in the field of the view, as well as in a gaze of the user, for at least the predetermined period of time. In some embodiments, the system permits modification of the predetermined period of time (e.g., by a user, or recommended by the system based on historic data of the user).

As another example, environment 700 may be a mountain range, and upon determining, based on detected eye motion (e.g., detected via a sensor) of the user, that an object (e.g., a mountain) is in the field of view of the user for at least a predetermined period of time, information concerning the mountain object may be generated for display to the user (e.g., the name of the mountain, the elevation of the mountain, the location of the mountain, etc.).

In some aspects of this disclosure, determining whether the object is in the field of view for the predetermined period of time may comprise determining that the field of view is continuously on the object for the predetermined period of time (e.g., five seconds) during an XR session. For example, if the system detects that the field of view of the user has shifted during countdown of a timer to the predetermined period of time, the countdown may be reset.

Alternatively, determining whether the object is in the field of view for the predetermined period of time may comprise determining that the field of view is non-continuously on the object for the predetermined period of time (e.g., five seconds) during an XR session. For example, if the system detects that the field of view of the user has shifted during countdown of a timer to the predetermined period of time, the countdown may be paused, and resumed upon detecting that the gaze of the user has returned to the object.

In some embodiments, the system may determine whether a new object is in the field of view for at least the predetermined time. For example, in response to the system making such a determination, the system may generate for display in the XR environment one or more items related to the new object, while continuing to generate for display in the XR environment the one or more items related to the object (e.g., object 708 and item 714). This enables a user to view additional information for multiple items during at least the duration of the XR session. In some embodiments, the additional information items may be maintained in a next user session in the XR environment.

In some embodiments, the system may determine that at least a predetermined period of time (e.g., 10 seconds) has elapsed from commencing the display of one or more items 714 without object 708 being in the field of view for the first predetermined period of time. For example, if at least the predetermined period of time (e.g., 10 seconds) has passed since item 714 was provided to the user, and object 708 associated with item 714 has not been in the field of view during such period of time, display of item 714 may be ceased (e.g., since the user may no longer be interested in object 708).

In certain embodiments, additional input (e.g., voice commands, hand gestures, touch) may be utilized in combination with detecting the eye motion of the user. For example, the system may receive a voice command indicating that the user no longer wishes to view additional information related to an item of interest, or may receive a voice command to display additional information, and may retrieve additional information related to the item of interest (e.g., item 708) from item information database 712.

Figure 8:
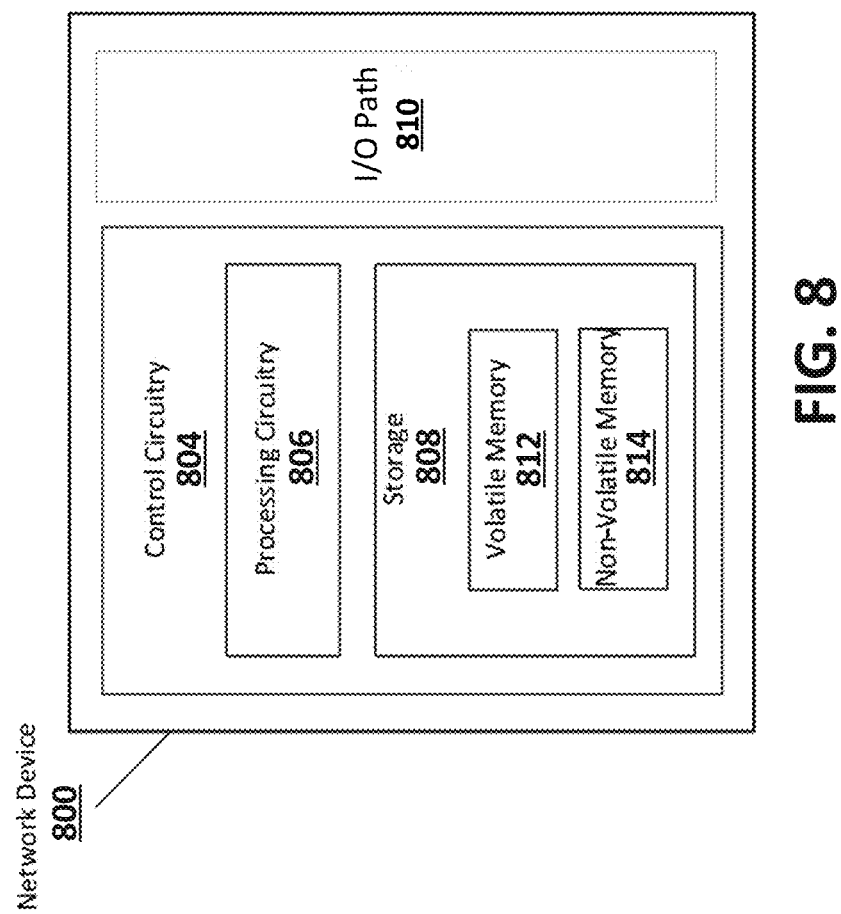
FIG. 8 is a block diagram of an illustrative device in an extended reality system, in accordance with some embodiments of this disclosure.

FIG. 8 is a block diagram of an illustrative device in an XR system, in accordance with some embodiments of this disclosure. Device 800 in an XR system may include one or more servers for generating, displaying, and/or managing an XR environment, transmitted over a computer network to XR devices (e.g., devices 102, 202, 302, 402, 502, 602, 702 of FIGS. 1-7, respectively). The device 800 may include control circuitry 804 and an I/O path 810. Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quadcore, hexa-core, or any suitable number of cores) or supercomputer.

In some embodiments, processing circuitry 806 may be distributed across multiple separate processors or processing units, for example, multiple of the same type of processing units (e.g., two Intel Core i7 processors) or multiple different processors (e.g., an Intel Core i5 processor and an Intel Core i7 processor). I/O path 810 may provide device information, or other data, over a local area network (LAN) or wide area network (WAN), and/or other content and data to control circuitry 804, which includes processing circuitry 806 and storage 808. Control circuitry 804 may be used to send and receive commands, requests, signals (digital and analog), and other suitable data using I/O path 810. I/O path 810 may connect control circuitry 804 (and specifically processing circuitry 806) to one or more communications paths. In some embodiments, storage 808 may include table 316 of FIG. 3 and/or item information database 712 of FIG. 7.

In some embodiments, control circuitry 804 executes instructions for execution of XR content generation and/or processing functions stored in memory (e.g., storage 808). The instructions may be stored in either a non-volatile memory 814 and/or a volatile memory 812 and loaded into processing circuitry 806 at the time of execution. A system for generating and processing XR content (e.g., the systems described in reference to FIGS. 1-7) may be a stand-alone application implemented on a user device (e.g., end-user device 920) and/or a server (e.g., server 900) or distributed across multiple devices in accordance with device 800. The system may be implemented as software or a set of executable instructions. The instructions for performing any of the embodiments discussed herein of XR processing may be encoded on non-transitory computer-readable media (e.g., a hard drive, random-access memory on a DRAM integrated circuit, read-only memory on a BLURAY disk, etc.) or transitory computer-readable media (e.g., propagating signals carrying data and/or instructions). For example, instructions in accordance with the processes described herein may be stored in storage 808 and executed by control circuitry 804 of device 800.

Control circuitry 804 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 804 may also include scaler circuitry for upconverting and downconverting content into the preferred output format of the end-user devices 920, 925, 930 of FIG. 9. Circuitry 804 may also include digital-to-analog converter circuitry and analog-to-digital converter circuitry for converting between digital and analog signals. The tuning and encoding circuitry may be used to receive and to display, to play, or to record content. The tuning and encoding circuitry may also be used to receive guidance data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, functions for incorporating video or other recordings of physical environments, multiple-tuner recording, etc.). If storage 808 is provided as a separate device from device 800, the tuning and encoding circuitry (including multiple tuners) may be associated with storage 808. Device 800 may be a central device in communication with each device (e.g., 102, 202, 302, 402, 502, 602, 702). Alternatively, device 800 may correspond to device 104, that is, each system (e.g., of FIGS. 1-7) may not have its own device 920, but rather a single central device 800 may carry out XR environment generation and processes for each system.

Figure 9:
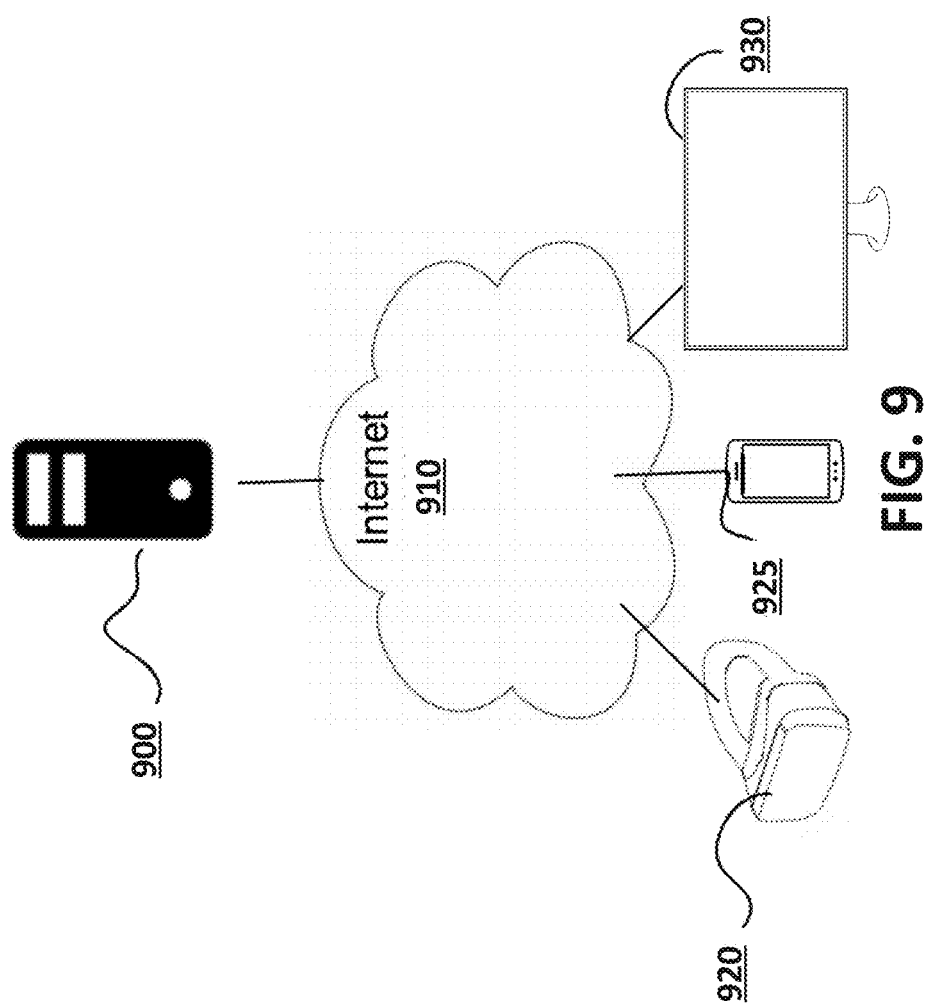
FIG. 9 is a block diagram of an illustrative extended reality system, in accordance with some embodiments of this disclosure.

FIG. 9 shows an illustrative block diagram of an XR content system according to some embodiments of the disclosure. At least one XR content server 900 generates XR content, such as that described herein. XR content server 900 may transmit the content over internet 910 to multiple end-user devices including devices 920, 925, 930. End-user XR devices may include, for example, personal computers, mobile devices (e.g., smart phones), and/or wearable devices including XR headsets, goggles, suits, gloves, etc., configured to present and allow interaction with XR environments. These devices are configured to allow an operator/user to view and interact with multi-user XR content (e.g., via a display screen). These devices may provide, for example, visual, audio, and haptic feedback that presents the perspectives and attention-directing cues such as described herein. End-user devices 920, 925, 930 also transmit data to server 900 via internet 910, where such data includes orientation information indicating the direction the devices 920, 925, 930 are facing (and thus the view that server 900 must generate for display on each device 920, 925, 930), audio signals detected by each device 920, 925, 930, and user input such as selections of XR objects. Server 900 may then generate a view of the XR environment for each device 920, 925, 930.

Figure 10:
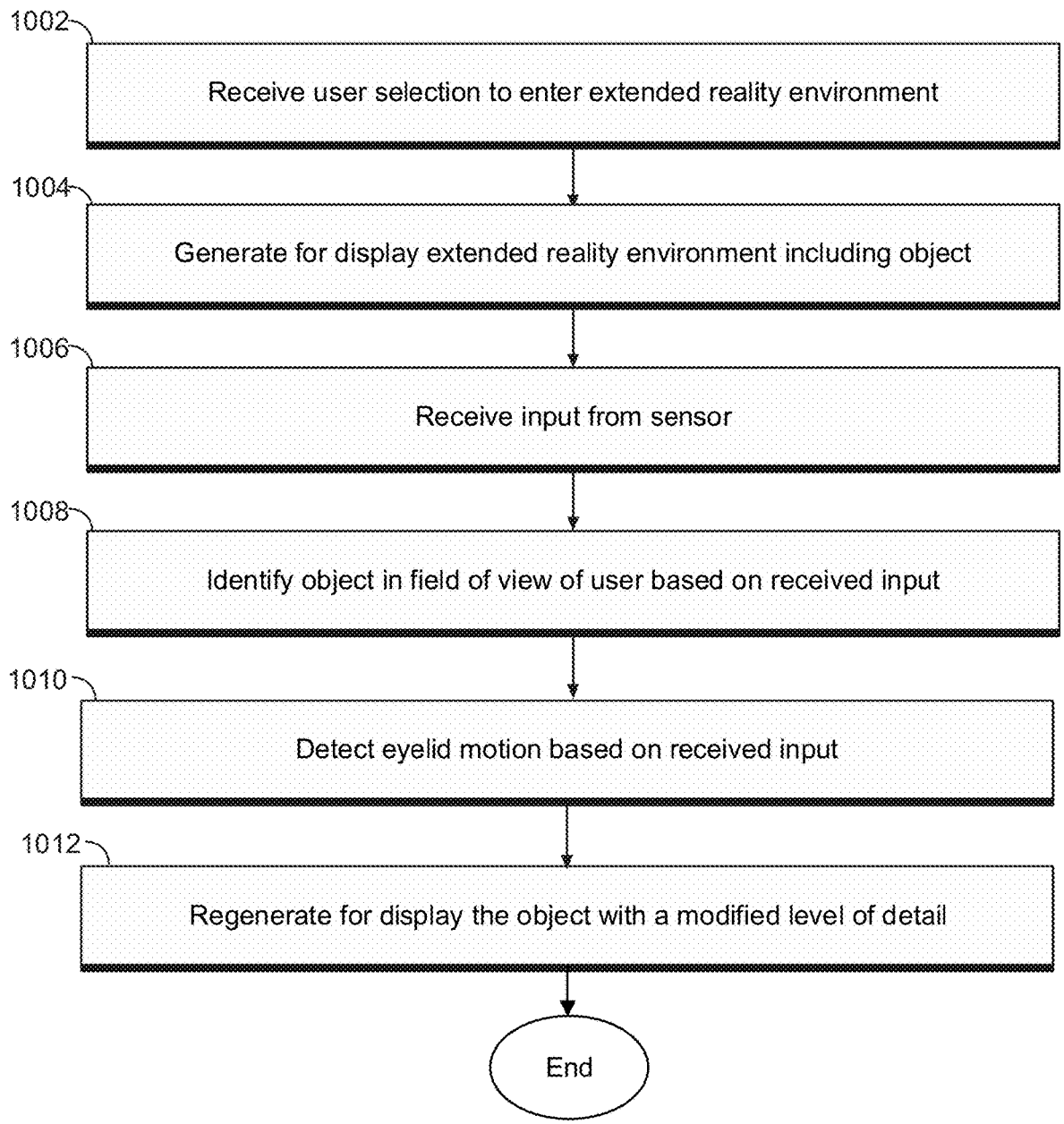
FIG. 10 is a flowchart of a detailed illustrative process for regenerating for display an object in an extended reality environment, in accordance with some embodiments of this disclosure.

FIG. 10 is a flowchart of a detailed illustrative process for regenerating for display an object in an XR environment, in accordance with some embodiments of this disclosure. It should be noted that process 1000 or any step thereof could be performed on, or provided by, any of the devices shown in FIGS. 8-9. For example, process 1300 may be executed by network device 800 (e.g., via control circuitry 804), and/or control circuitry of the server 900, and/or control circuitry of device 920, 925, 930, as instructed by one or more programs of computer-executable instructions that may be implemented on network device 800, and/or server 900, and/or device 920, 925, 930, such as to distribute control of the extended reality environment among multiple devices. In addition, one or more steps of process 1000 may be incorporated into or combined with one or more steps of any other process or embodiment (e.g., process 1100 of FIG. 11, process 1200 of FIG. 12, process 1300 of FIG. 13, process 1400 of FIG. 14, process 1500 of FIG. 15).

At 1002, input/output (I/O) circuitry (e.g., I/O circuitry of head-mounted display 102) may receive a user selection to enter an XR environment (e.g., a VR, AR, or MR environment). Such user selection may be received via input (e.g., voice command or touchscreen).

At 1004, control circuitry (e.g., control circuitry 804 of FIG. 8 and/or control circuitry of head-mounted display 102 of FIG. 1) may, in response to receiving the user selection, generate for display (e.g., via head-mounted device 102 of FIG. 1) the XR environment including an object (e.g., car object 104 of FIG. 1)

At 1006, I/O circuitry (e.g., I/O circuitry of head-mounted display 102) may receive input from a sensor (e.g., a camera). The sensor may detect various attributes of the eye of the user (e.g., eyelid motion, gaze).

At 1008, the control circuitry (e.g., control circuitry 804 of FIG. 8 and/or control circuitry of head-mounted display 102 of FIG. 1) may identify an object (e.g., car object 104 of FIG. 1) in a field of view of the user, based on the received input. In some embodiments, the control circuitry may generate a data structure for the field of view, including object identifiers associated with virtual objects in the field of view, and such data structure may include coordinates representing the position of the field of view in the XR environment. The control circuitry may determine the present field of view based on the data structure and/or images captured by the XR device 102, and identify objects in the field of view of the user.

At 1010, the control circuitry may detect eyelid motion (e.g., an amount of eyelid motion, a blink pattern, eyelid level, etc.) of the user based on the received input from the sensor (e.g., a camera). In some embodiments, such eyelid motion may be distinguished from involuntary blinks, to avoid interpreting such involuntary blinks of the user as a command. For example, the system may disregard blink patterns where the eye remains closed for less than a predetermined amount of time (e.g., 0.5 seconds).

At 1012, the control circuitry may regenerate for display the object (e.g., car object 104 of FIG. 1) with a modified level of detail, in response to detecting the eyelid motion. For example, the control circuitry may regenerate for display the object in a higher resolution upon detecting a particular blink pattern. In some embodiments, the control circuitry may reference a table (e.g., table 316 of FIG. 3), that stores associations between eyelid motion identifiers and performable actions, to determine whether the detected eyelid motion matches the eyelid motion identifier for modifying a level of detail of the object.

Figure 11:
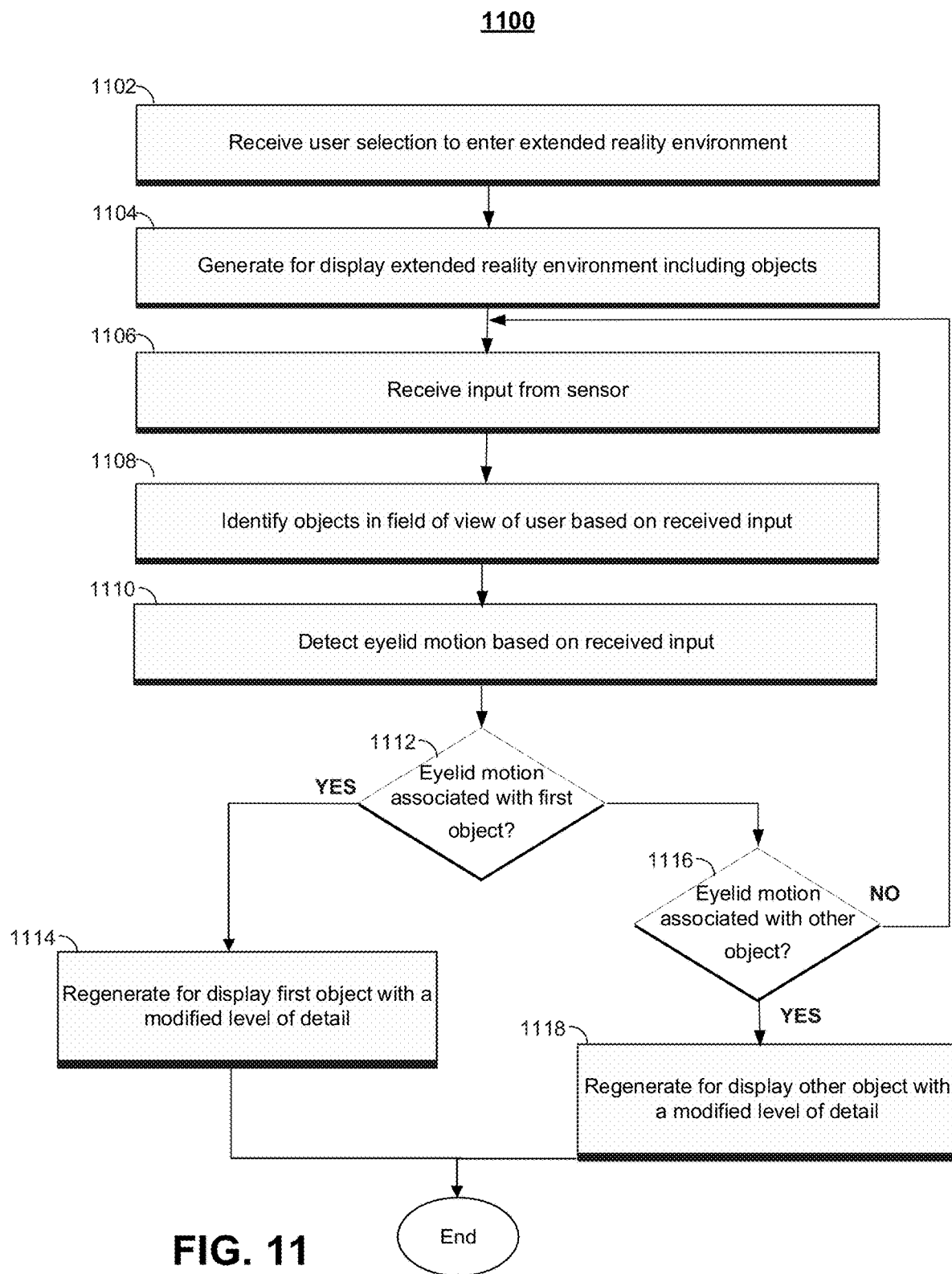
FIG. 11 is a flowchart of a detailed illustrative process for regenerating for display an object in an extended reality environment, in accordance with some embodiments of this disclosure.

FIG. 11 is a flowchart of a detailed illustrative process for regenerating for display an object in an XR environment, in accordance with some embodiments of this disclosure. For example, process 1100 may be executed by network device 800 (e.g., via control circuitry 804), and/or control circuitry of the server 900, and/or control circuitry of device 920, 925, 930, as instructed by one or more programs of computer-executable instructions that may be implemented on network device 800, and/or server 900, and/or device 920, 925, 930, such as to distribute control of the extended reality environment among multiple devices. In addition, one or more steps of process 1100 may be incorporated into or combined with one or more steps of any other process or embodiment (e.g., process 1000 of FIG. 10, process 1200 of FIG. 12, process 1300 of FIG. 13, process 1400 of FIG. 14, process 1500 of FIG. 15).

At 1102, I/O circuitry (e.g., I/O circuitry of head-mounted display 202) may receive a user selection to enter an XR environment (e.g., a VR, AR, or MR environment). Such user selection may be received via input (e.g., voice command or touchscreen).

At 1104, control circuitry (e.g., control circuitry 804 of FIG. 8 and/or control circuitry of head-mounted display 202 of FIG. 2) may, in response to receiving the user selection, generate for display (e.g., via head-mounted device 202 of FIG. 2) the XR environment including multiple objects (e.g., car object 204 of FIG. 2 and airplane object 208 of FIG. 2).

At 1106, I/O circuitry (e.g., I/O circuitry of head-mounted display 102) may receive input from a sensor (e.g., a camera). The sensor may detect various attributes of the eye of the user (e.g., eyelid motion, gaze).

At 1108, the control circuitry (e.g., control circuitry 804 of FIG. 8 and/or control circuitry of head-mounted display 202 of FIG. 1) may identify objects (e.g., car object 204 of FIG. 2 and airplane object 208 of FIG. 2) in a field of view of the user, based on the received input. In some embodiments, the control circuitry may generate a data structure for the field of view, including object identifiers associated with virtual objects in the field of view, and such data structure may include coordinates representing the position of the field of view in the XR environment. The control circuitry may determine the present field of view based on the data structure and/or images captured by the XR device 202, and identify objects in the field of view of the user.

At 1110, the control circuitry may detect eyelid motion (e.g., an amount of eyelid motion, a blink pattern, eyelid levels, etc.) of the user based on the received input from the sensor (e.g., a camera). In some embodiments, such eyelid motion may be distinguished from involuntary blinks, to avoid interpreting such involuntary blinks of the user as a command. For example, the system may disregard blink patterns where the eye remains closed for less than a predetermined amount of time (e.g., 0.5 seconds).

At 1112, the control circuitry may determine whether the eyelid motion is associated with a first object (e.g., car object 204 of FIG. 2). In the example of FIG. 2, the control circuitry may determine whether the detected eyelid motion matches the eyelid motion identifier "Blink once to modify details of car" (e.g., stored in table 316 of FIG. 3).

At 1114, upon determining that the detected eyelid motion matches the eyelid motion identifier for the first object (e.g., car object 204 of FIG. 2), the control circuitry may regenerate for display such object with a modified level of detail. For example, the control circuitry may regenerate for display such object in a higher resolution than initially presented upon detecting a particular blink pattern, or at a larger size than initially presented upon detecting a particular blink pattern.

At 1116, if the control circuitry determines that the eyelid motion is not associated with a first object (e.g., car object 204 of FIG. 2), the control circuitry may determine whether the eyelid motion is associated with a another object (e.g., airplane object 208 of FIG. 2). In the example of FIG. 2, the control circuitry may determine whether the detected eyelid motion matches the eyelid motion identifier "Blink twice to modify details of airplane" (e.g., stored in table 316 of FIG. 3).

At 1118, upon determining that the detected eyelid motion matches the eyelid motion identifier for the second object (e.g., airplane object 208 of FIG. 2), the control circuitry may regenerate for display such object with a modified level of detail. For example, the control circuitry may regenerate for display the object in a higher resolution than initially presented upon detecting a particular blink pattern, or at a larger size than initially presented upon detecting a particular blink pattern. Thus, the user may selectively cause his or her gaze or focus to shift in the XR environment by actuating his or her eyelids.

Figure 12:
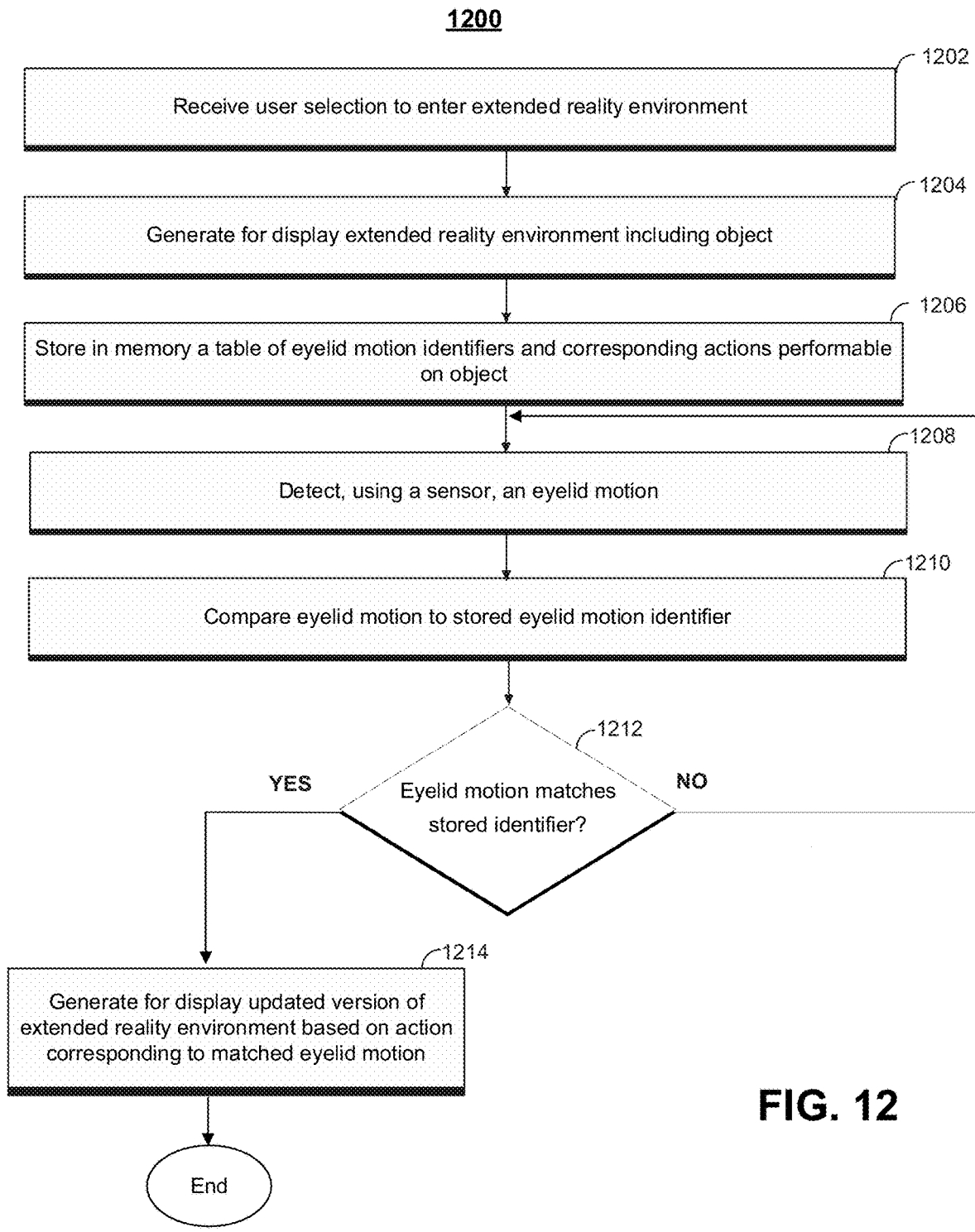
FIG. 12 is a flowchart of a detailed illustrative process for performing an action on an object in an extended reality environment, in accordance with some embodiments of this disclosure.

FIG. 12 is a flowchart of a detailed illustrative process for performing an action on an object in an XR environment, in accordance with some embodiments of this disclosure. For example, process 1200 may be executed by network device 800 (e.g., via control circuitry 804), and/or control circuitry of the server 900, and/or control circuitry of device 920, 925, 930, as instructed by one or more programs of computer-executable instructions that may be implemented on network device 800, and/or server 900, and/or device 920, 925, 930, such as to distribute control of the extended reality environment among multiple devices. In addition, one or more steps of process 1200 may be incorporated into or combined with one or more steps of any other process or embodiment (e.g., process 1000 of FIG. 10, process 1100 of FIG. 11, process 1300 of FIG. 13, process 1400 of FIG. 14, process 1500 of FIG. 15).

At 1202, I/O circuitry (e.g., I/O circuitry of head-mounted display 302) may receive a user selection to enter an XR environment (e.g., a VR, AR, or MR environment). Such user selection may be received via input (e.g., voice command or touch screen).

At 1204, control circuitry (e.g., control circuitry 804 of FIG. 8 and/or control circuitry of head-mounted display 302 of FIG. 3) may, in response to receiving the user selection, generate for display (e.g., via head-mounted device 302 of FIG. 3) the XR environment including an object (e.g., book object 304 of FIG. 3). In some embodiments, the control circuitry may generate a plurality of objects (e.g., book object 304, lamp object 310, desk 312, chair 314 of FIG. 3).

At 1206, the control circuitry may store in memory (e.g., storage 808 of FIG. 8 and/or storage of head-mounted display 302 of FIG. 3), or access in memory a table (e.g., table 316 of FIG. 3) of eyelid motion identifiers and corresponding actions performable on object.

At 1208, the control circuitry may detect eyelid motion (e.g., an amount of eyelid motion, a blink pattern, eyelid levels, etc.) of the user based on the received input from a sensor (e.g., a camera). In some embodiments, such eyelid motion may be distinguished from involuntary blinks, to avoid interpreting such involuntary blink of the user as a command. For example, the system may disregard blink patterns where the eye remains closed for less than a predetermined amount of time (e.g., 0.5 seconds).

At 1210, the control circuitry determines whether the detected eyelid motion matches any of the identifiers in the table (e.g., table 316 of FIG. 3). In some embodiments, the control circuitry may analyze the sensor output and compare such output to the stored identifiers (e.g., predetermined number of blinks, blink patterns, amount of eyelid motion, eyelid levels, etc.). In some embodiments, the stored identifiers may include eyelid motions in combination with voice commands or other inputs.

At 1212, the control circuitry determines whether the detected eyelid motion matches a stored eyelid motion identifier. In some embodiments, the control circuitry may compute a match score, and may determine that there is a match between the detected eyelid motion and the stored eyelid motion identifier when the computed match score exceeds a predetermined threshold.

At 1214, upon determining that the detected eyelid motion matches a stored eyelid motion identifier, the control circuitry generates for display an updated version of the XR environment based on action corresponding to matched eyelid motion. In the example of FIG. 3, the updated version of XR environment 300 includes book object 304 having a flipped page (e.g., in the environment 300 illustrated in the bottom portion of FIG. 3, as compared to the environment 300 illustrated in the top portion of FIG. 3, in which book object 304 is closed).

Figure 13:
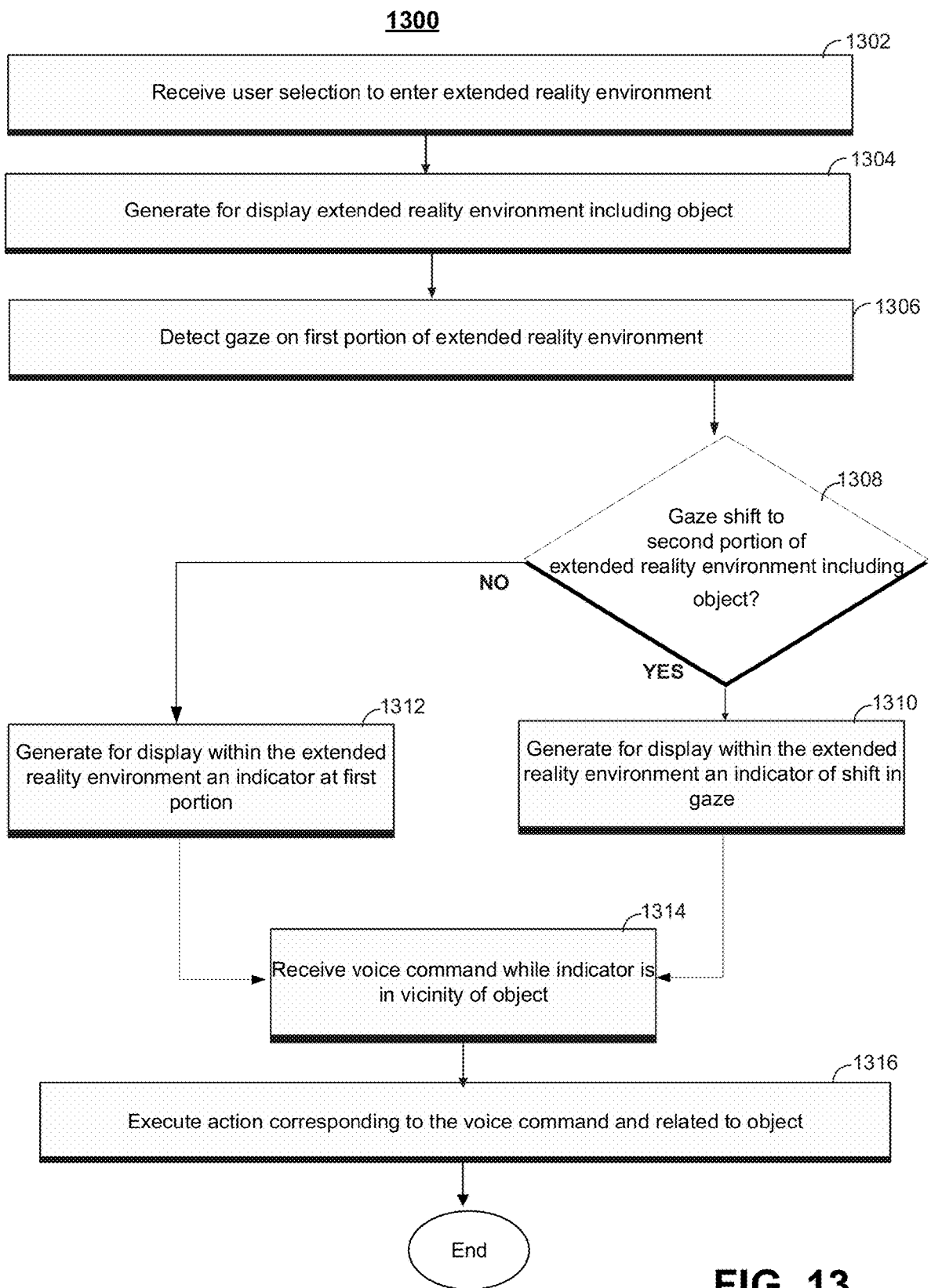
FIG. 13 is a flowchart of a detailed illustrative process for receiving a voice command while an indicator is in a vicinity of an object in an extended reality environment, in accordance with some embodiments of this disclosure.

FIG. 13 is a flowchart of a detailed illustrative process for receiving a voice command while an indicator is in a vicinity of an object in an XR environment, in accordance with some embodiments of this disclosure. For example, process 1300 may be executed by network device 800 (e.g., via control circuitry 804), and/or control circuitry of the server 900, and/or control circuitry of device 920, 925, 930, as instructed by one or more programs of computer-executable instructions that may be implemented on network device 800, and/or server 900, and/or device 920, 925, 930, such as to distribute control of the extended reality environment among multiple devices. In addition, one or more steps of process 1300 may be incorporated into or combined with one or more steps of any other process or embodiment (e.g., process 1000 of FIG. 10, process 1100 of FIG. 11, process 1200 of FIG. 12, process 1400 of FIG. 14, process 1500 of FIG. 15).

At 1302, I/O circuitry (e.g., I/O circuitry of head-mounted display 402 of FIGS. 4A-4B) may receive a user selection to enter an XR environment (e.g., a VR, AR, or MR environment). Such user selection may be received via input (e.g., voice command or touch screen).

At 1304, control circuitry (e.g., control circuitry 804 of FIG. 8 and/or control circuitry of head-mounted display 402 of FIG. 4A) may, in response to receiving the user selection, generate for display (e.g., via head-mounted device 402 of FIG. 4) the XR environment including an object (e.g., object 408 of FIG. 4). In some embodiments, the control circuitry may generate a plurality of objects (e.g., objects 408 and 410 of FIG. 4).

At 1306, the control circuitry may detect the gaze of the user. For example, a sensor (e.g., a camera) may be used to track retinal movement of the user, and such retinal movement of the user may be plotted to the display of the XR environment (e.g., environment 400 of FIGS. 4A-4B).

At 1308, the control circuitry may determine whether the gaze of the user has shifted to a second portion of the XR environment including an object (e.g., object 410 of FIGS. 4A-4B). In some embodiments, the gaze of the user may have shifted from a first portion of the display in which no object is included. Alternatively, such first portion of the display may include an object (e.g., object 408 of FIGS. 4A-4B).

At 1310, in response to determining that the gaze of the user has shifted to such second portion of the XR environment including an object (e.g., object 410 of FIGS. 4A-4B), the control circuitry may generate for display an indicator (e.g., indicator 406 of FIG. 4) of the shift in gaze. For example, such indicator enables a user to confirm that the system is accurately tracking his or her gaze.

At 1312, in response to determining that the gaze of the user has not shifted to such second portion of XR environment, the control circuitry may determine that the gaze of the user has not shifted, or has shifted to a different portion of the display, and may generate for display the indicator (e.g., indicator 406 of FIG. 4) at the portion of the display at which the gaze of the user is directed.

At 1314, I/O circuitry (e.g., I/O circuitry of head-mounted display 402 of FIGS. 4A-4B) may receive a voice command while the indicator (e.g., indicator 406 of FIG. 4) is in a vicinity of the object of interest (e.g., object 408 of FIG. 4A or object 410 of FIG. 4B). In some embodiments, control circuitry (e.g., control circuitry 804 of FIG. 8 and/or control circuitry of head-mounted display 402 of FIG. 4A) may determine whether the voice command relates to such object of interest. In the example of FIG. 4A, the control circuitry may extract keywords from the voice command of "Play 'The Dark Knight'" and compare the extracted keywords to metadata associated with the object (e.g., object 408) to which the gaze of the user is directed, to determine whether the voice command relates to the object of interest.

At 1316, the control circuitry may execute the action corresponding to the voice command related to the object. For example, in the example of FIG. 4B, object 410, an identifier for the media content item "American Psycho," is in a vicinity of indicators 406, and upon receiving the voice command 405 ("Play 'American Psycho'"), presentation of such media asset to the user may commence.

Figure 14:
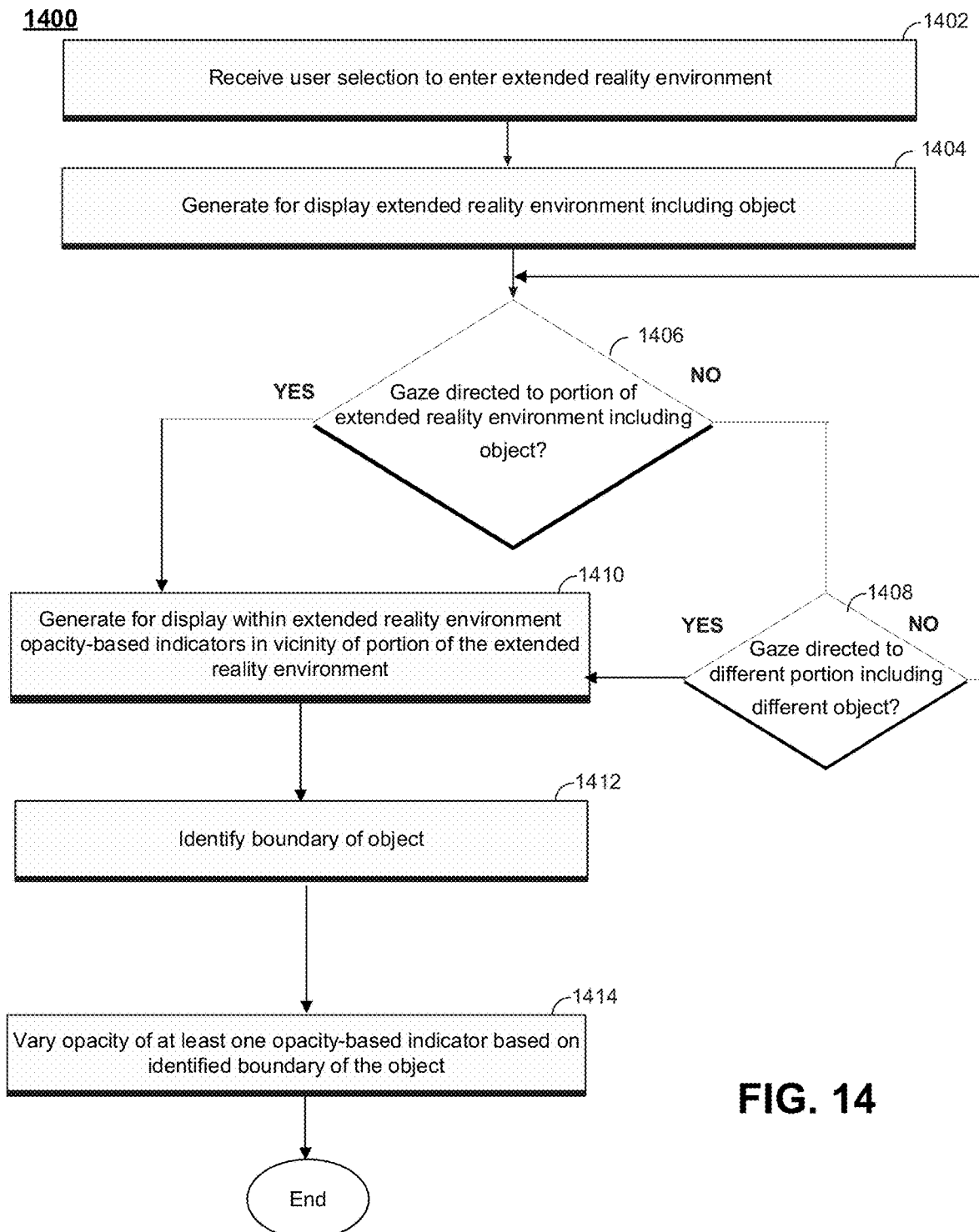
FIG. 14 is a flowchart of a detailed illustrative process for varying an opacity of indicators in an extended reality environment, in accordance with some embodiments of this disclosure.

FIG. 14 is a flowchart of a detailed illustrative process for varying an opacity of indicators in an XR environment, in accordance with some embodiments of this disclosure. It should be noted that process 1400 or any step thereof could be performed on, or provided by, any of the devices shown in FIGS. 8-9. For example, process 1400 may be executed by network device 800 (e.g., via control circuitry 804), and/or control circuitry of the server 900, and/or control circuitry of device 920, 925, 930, as instructed by one or more programs of computer-executable instructions that may be implemented on network device 800, and/or server 900, and/or device 920, 925, 930, such as to distribute control of the extended reality environment among multiple devices. In addition, one or more steps of process 1400 may be incorporated into or combined with one or more steps of any other process or embodiment (e.g., process 1000 of FIG. 10, process 1100 of FIG. 11, process 1200 of FIG. 12, process 1300 of FIG. 13, process 1500 of FIG. 15).

At 1402, I/O circuitry (e.g., I/O circuitry of head-mounted display 502 of FIG. 5) may receive a user selection to enter an XR environment (e.g., a VR, AR, or MR environment). Such user selection may be received via input (e.g., voice command or touch screen).

At 1404, control circuitry (e.g., control circuitry 804 of FIG. 8 and/or control circuitry of head-mounted display 502 of FIG. 5) may, in response to receiving the user selection, generate for display (e.g., via head-mounted device 502 of FIG. 5) the XR environment including an object (e.g., object 508 of FIG. 5). In some embodiments, the control circuitry may generate a plurality of objects (e.g., objects 508 and 510 of FIG. 5).

At 1406, the control circuitry may detect the gaze of the user. For example, a sensor (e.g., a camera) may be used to track retinal movement of the user, and such retinal movement of the user may be plotted to the display of the XR environment (e.g., environment 500 of FIG. 5). The control circuitry may determine whether the gaze of the user is directed to a portion of the XR environment including an object (e.g., object 508 of FIG. 5).

At 1410, upon determining that the gaze of the user is not directed to a portion of the XR environment including the object (e.g., object 508 of FIG. 5), the control circuitry may determine whether the gaze of the user is directed to a different portion of the XR environment including a different object (e.g., object 510 of FIG. 5).

At 1410, upon determining that the gaze of the user is directed to a portion of the XR environment including an object (e.g., object 508 of FIG. 5), the control circuitry may generate for display within the XR environment opacity-based indicators (e.g., indicators 506 of FIG. 6) in vicinity of such portion of the XR environment. On the other hand, upon determining that the gaze of the user is directed to a different portion of the XR environment including a different object (e.g., object 510 of FIG. 5), the control circuitry may generate for display within XR environment opacity-based indicators (e.g., indicators 506 of FIG. 6) in the vicinity of such different portion of the XR environment.

At 1412, the control circuitry may determine a boundary of the object of interest (e.g., object 508 in FIG. 5). For example, the control circuitry may perform edge detection techniques and/or pixel comparison to determine the boundary of the object.

At 1414, the control circuitry varies opacity of at least one opacity-based indicator (e.g., indicator 506 of FIG. 5) based on an identified boundary of the object. In some embodiments, the opacity of indicators overlapping the boundary of the object of interest is varied. For example, the opacity of indicators overlapping the boundary of the object of interest may be decreased, to avoid obscuring the object of interest (FIG. 6), or may be increased, to emphasize that the gaze of the user is directed to the object of interest (FIG. 5).

Figure 15:
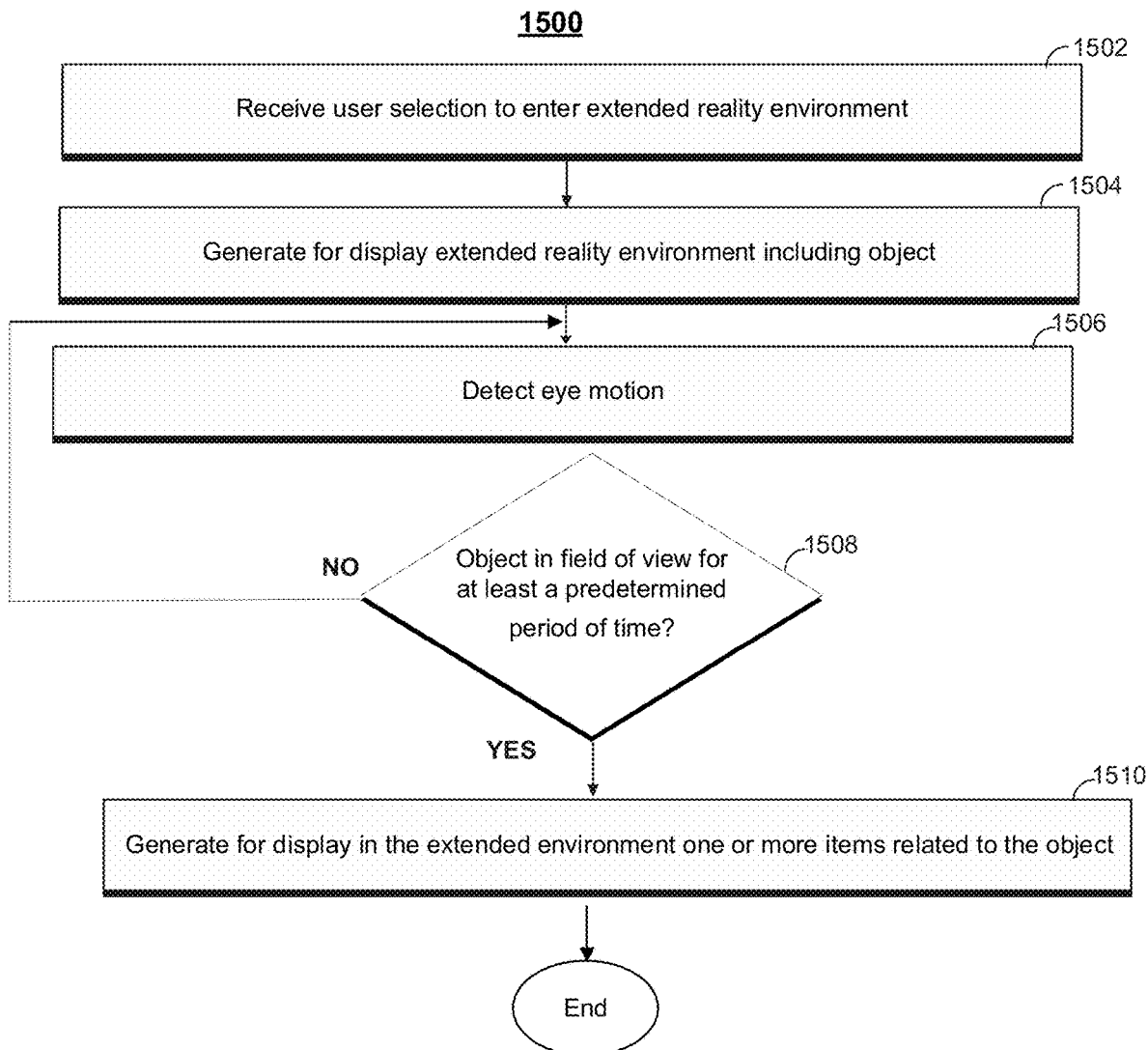
FIG. 15 is a flowchart of a detailed illustrative process for presenting additional information related to an item in an extended reality environment, in accordance with some embodiments of this disclosure.

FIG. 15 is a flowchart of a detailed illustrative process for presenting additional information related to an item in an XR environment, in accordance with some embodiments of this disclosure. It should be noted that process 1500 or any step thereof could be performed on, or provided by, any of the devices shown in FIGS. 8-9. For example, process 1500 may be executed by network device 800 (e.g., via control circuitry 804), and/or control circuitry of the server 900, and/or control circuitry of device 920, 925, 930, as instructed by one or more programs of computer-executable instructions that may be implemented on network device 800, and/or server 900, and/or device 920, 925, 930, such as to distribute control of the extended reality environment among multiple devices. In addition, one or more steps of process 1500 may be incorporated into or combined with one or more steps of any other process or embodiment (e.g., process 1000 of FIG. 10, process 1100 of FIG. 11, process 1200 of FIG. 12, process 1300 of FIG. 13, process 1400 of FIG. 14).

At 1502, I/O circuitry (e.g., I/O circuitry of head-mounted display 702 of FIG. 7) may receive a user selection to enter an XR environment (e.g., a VR, AR, or MR environment). Such user selection may be received via input (e.g., voice command or touchscreen).

At 1504, control circuitry (e.g., control circuitry 804 of FIG. 8 and/or control circuitry of head-mounted display 702 of FIG. 7) may, in response to receiving the user selection, generate for display (e.g., via head-mounted device 702 of FIG. 7) the XR environment including an object (e.g., object 708 of FIG. 7). In some embodiments, the control circuitry may generate a plurality of objects (e.g., objects 702, 704, 708 of FIG. 7).

At 1506, control circuitry (e.g., control circuitry 804 of FIG. 8 and/or control circuitry of head-mounted display 702 of FIG. 7) may detect eye motion of the user (e.g., using a sensor).

At 1508, the control circuitry may determine whether an object is in a field of view of the user for at least a predetermined period of time. In some embodiments, the control circuitry may generate a data structure for the field of view, including object identifiers associated with virtual objects in the field of view, and such data structure may include coordinates representing the position of the field of view in the VR environment. The control circuitry may determine the present field of view based on the data structure and/or images captured by head-mounted display 702, and identify objects in the field of view of the user. In certain embodiments, the control circuitry may additionally detect whether a gaze of the user is directed at the object within the field of view.

At 1510, the control circuitry, in response to determining that the object is in the field of view for at least the predetermined period of time (e.g., five seconds), the control circuitry generates for display in the XR environment one or more items (e.g., item 714 of FIG. 7) related to the object (e.g., object 708 of FIG. 7). In some embodiments, in determining whether the object is in the field of view for at least the predetermined period of time, the control circuitry may determine whether the object remains in the field of view of the user for a continuous (or non-continuous) period of time during the XR session.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for extended reality environment interaction, comprising:
generating for display an extended reality environment including an object;
detecting an eye motion of a user;
determining, based on the detecting, whether the object is in a field of view of the user for at least a first predetermined period of time;
in response to determining that the object is in the field of view of the user for at least the first predetermined period of time, generating for display in the extended reality environment one or more items related to the object;
determining that at least a second predetermined period of time has elapsed from commencing the display of the one or more items related to the object without the object being in the field of view of the user; and
ceasing display of the one or more items related to the object in response to determining that the second predetermined period of time has elapsed from commencing the display of the one or more items related to the object without the object being in the field of view of the user.

2. The method of claim 1, wherein the one or more items related to the object comprise textual information, one or more images, video, or any combination thereof.

3. The method of claim 1, wherein:
determining that at least the second predetermined period of time has elapsed from commencing the display of the one or more items related to the object without the object being in the field of view of the user further comprises determining that the object has not been in the field of view of the user for at least the first predetermined period of time; and
ceasing the display of the one or more items related to the object in response to determining that the second predetermined period of time has elapsed from commencing the display of the one or more items related to the object without the object being in the field of view of the user is performed further in response to determining that the object has not been in the field of view of the user for at least the first predetermined period of time.

4. The method of claim 1, wherein detecting the eye motion comprises monitoring an eyelid motion.

5. The method of claim 1, wherein:
generating for display in the extended reality environment the one or more items related to the object is performed in response to determining that the object is in the field of view of the user, and in a gaze of the user, for at least the first predetermined period of time.

6. The method of claim 1, wherein determining, based on the detecting, whether the object is in the field of view of the user for the first predetermined period of time comprises determining that the object is continuously in the field of view of the user for the first predetermined period of time during an extended reality session.

7. The method of claim 1, wherein determining, based on the detecting, whether the object is in the field of view of the user for the first predetermined period of time comprises determining that the object is non-continuously in the field of view of the user for the first predetermined period of time during an extended reality session.

8. The method of claim 1, further comprising:
determining a new object is in the field of view of the user for at least the first predetermined time; and
in response to determining that the new object is in the field of view of the user for at least the first predetermined period of time, generating for display in the extended reality environment one or more items related to the new object, while continuing to generate for display in the extended reality environment the one or more items related to the object.

9. The method of claim 1, further comprising:
permitting modification of an amount of time for the first predetermined period of time.

10. The method of claim 1, wherein the extended reality environment is presented via an extended reality head-mounted device.

11. A system for extended reality environment interaction, comprising:
   a display;
   control circuitry configured to:
      generate for display an extended reality environment including an object, wherein the object is presented at the display;
      detect an eye motion of a user;
      determine, based on the detecting, whether the object is in a field of view of the user for at least a first predetermined period of time;
      in response to determining that the object is in the field of view of the user for at least the first predetermined period of time, generate for display in the extended reality environment one or more items related to the object;
      determine that at least a second predetermined period of time has elapsed from commencing the display of the one or more items related to the object without the object being in the field of view of the user; and
      cease display of the one or more items related to the object in response to determining that the second predetermined period of time has elapsed from commencing the display of the one or more items related to the object without the object being in the field of view of the user.

12. The system of claim 11, wherein the one or more items related to the object comprise textual information, one or more images, video, or any combination thereof.

13. The system of claim 11, wherein the control circuitry is further configured to:
   determine that at least the second predetermined period of time has elapsed from commencing the display of the one or more items related to the object without the object being in the field of view of the user by determining that the object has not been in the field of view of the user for at least the first predetermined period of time; and
   cease the display of the one or more items related to the object in response to determining that the second predetermined period of time has elapsed from commencing the display of the one or more items related to the object without the object being in the field of view of the user and further in response to determining that the object has not been in the field of view of the user for at least the first predetermined period of time.

14. The system of claim 11, wherein the control circuitry is further configured to, in detecting the eye motion, monitor an eyelid motion.

15. The system of claim 11, wherein the control circuitry is further configured to generate for display in the extended reality environment the one or more items related to the object in response to determining that the object is in the field of view of the user, and in a gaze of the user, for at least the first predetermined period of time.

16. The system of claim 11, wherein the control circuitry is further configured to, in determining whether the object is in the field of view of the user for the first predetermined period of time, determine that the object is continuously in the field of view of the user for the first predetermined period of time during an extended reality session.

17. The system of claim 11, wherein the control circuitry is further configured to, in determining whether the object is in the field of view of the user for the first predetermined period of time, determine that the object is non-continuously in the field of view of the user for the first predetermined period of time during an extended reality session.

18. The system of claim 11, wherein the control circuitry is further configured to:
   determine a new object is in the field of view of the user for at least the first predetermined time; and
   in response to determining that the new object is in the field of view of the user for at least the first predetermined period of time, generate for display in the extended reality environment one or more items related to the new object, while continuing to generate for display in the extended reality environment the one or more items related to the object.

19. The system of claim 11, wherein the control circuitry is further configured to:
   permitting modification of an amount of time for the first predetermined period of time.

20. The system of claim 11, wherein the extended reality environment is presented via an extended reality head-mounted device.

* * * * *